(12) United States Patent
Yu

(10) Patent No.: US 12,345,564 B2
(45) Date of Patent: Jul. 1, 2025

(54) PHOTONIC PRESSURE SENSOR

(71) Applicant: ROCKLEY PHOTONICS LIMITED, Altrincham (GB)

(72) Inventor: Guomin Yu, Glendora, CA (US)

(73) Assignee: ROCKLEY PHOTONICS LIMITED, Altrincham (GB)

(*) Notice: Subject to any disclaimer, the term of this patent is extended or adjusted under 35 U.S.C. 154(b) by 325 days.

(21) Appl. No.: 17/938,328

(22) Filed: Oct. 5, 2022

(65) Prior Publication Data

US 2023/0112830 A1   Apr. 13, 2023

(30) Foreign Application Priority Data

Oct. 7, 2021   (GB) .................................... 2114380

(51) Int. Cl.
*G01H 9/00*   (2006.01)

(52) U.S. Cl.
CPC ..................................... *G01H 9/00* (2013.01)

(58) Field of Classification Search
CPC ....................................................... G01H 9/00
See application file for complete search history.

(56) References Cited

U.S. PATENT DOCUMENTS

| | | | | |
|---|---|---|---|---|
| 2007/0081165 A1* | 4/2007 | Kilic | .............. | G01H 9/00 358/478 |
| 2011/0187868 A1* | 8/2011 | Chang | .............. | G01H 9/006 348/163 |
| 2016/0197111 A1* | 7/2016 | Coolbaugh | ......... | H01L 31/0232 438/69 |
| 2019/0285552 A1* | 9/2019 | Zhang | .............. | G02B 6/1225 |
| 2020/0174186 A1* | 6/2020 | Westerveld | ........ | G02B 6/12002 |

FOREIGN PATENT DOCUMENTS

| | | | |
|---|---|---|---|
| EP | 1 736 804 A1 | 12/2006 | |
| EP | 3663818 A1 | 6/2020 | |
| GB | 2369449 A * | 5/2002 | ........... G02B 6/1228 |
| WO | 2009028701 A2 | 3/2009 | |

OTHER PUBLICATIONS

International Search Report and Written Opinion of the International Searching Authority, mailed Jan. 26, 2023, corresponding to PCT/EP2022/077968, 16 pages.

(Continued)

*Primary Examiner* — David Z Huang
*Assistant Examiner* — Jean F Morello
(74) *Attorney, Agent, or Firm* — Womble Bond Dickinson (US) LLP

(57) ABSTRACT

A sensor. In some embodiments, the sensor includes a first waveguide, a flexible support element, and a second waveguide. A first portion of the first waveguide may be supported by the flexible support element and separated by a first gap from a second portion of the first waveguide. The flexible support element may be capable of bending so as to cause an effective index of refraction of the first waveguide to change. The first waveguide may be coupled to the second waveguide through a second gap, the second gap being at an end of the first waveguide and an end of the second waveguide.

21 Claims, 31 Drawing Sheets

(56) References Cited

OTHER PUBLICATIONS

U.K. Intellectual Property Office Examination Report, Dated Jun. 13, 2024, for Patent Application No. GB2114380.5, 3 pages.
U.K. Intellectual Property Office Search and Examination Report, dated Jul. 11, 2022, for Patent Application No. GB2114380.5, 13 pages.
Westerveld et al. "Sensitive, small, broadband and scalable optomechanical ultrasound sensor in silicon photonics", Letters, May 2021, Nat. Photonics 15, 341-345 (2021). https://doi.org/10.1038/s41566-021-00776-0.

* cited by examiner

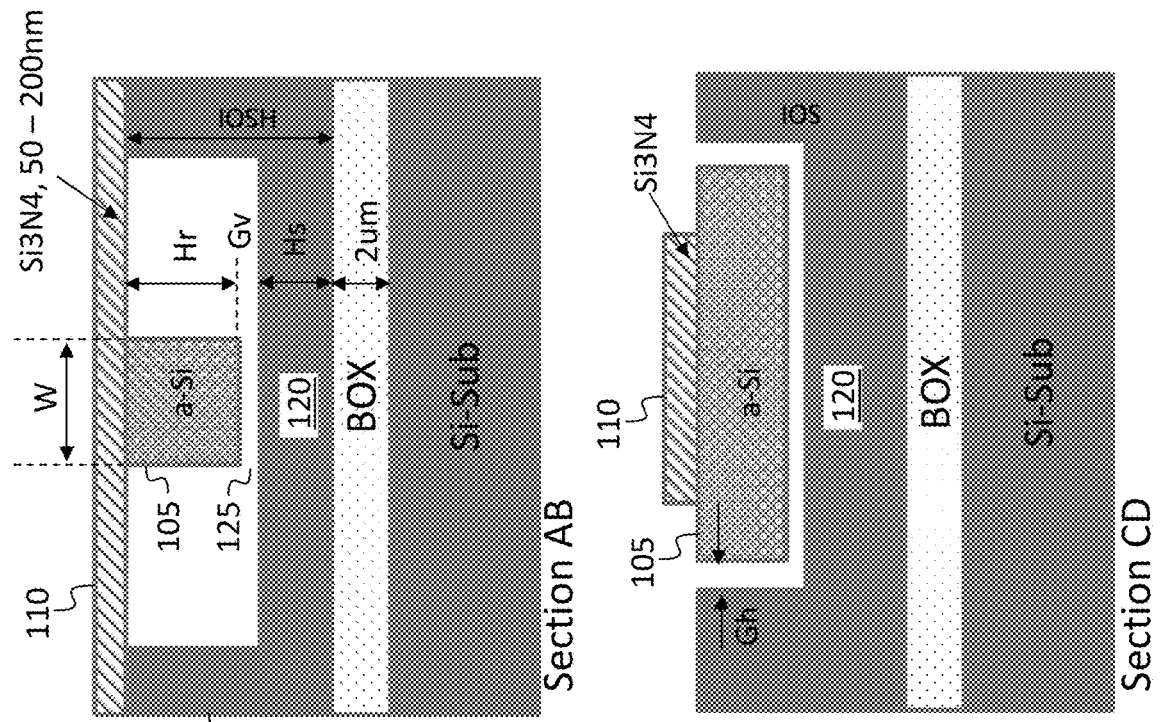
FIG. 1B Section AB
FIG. 1C Section CD
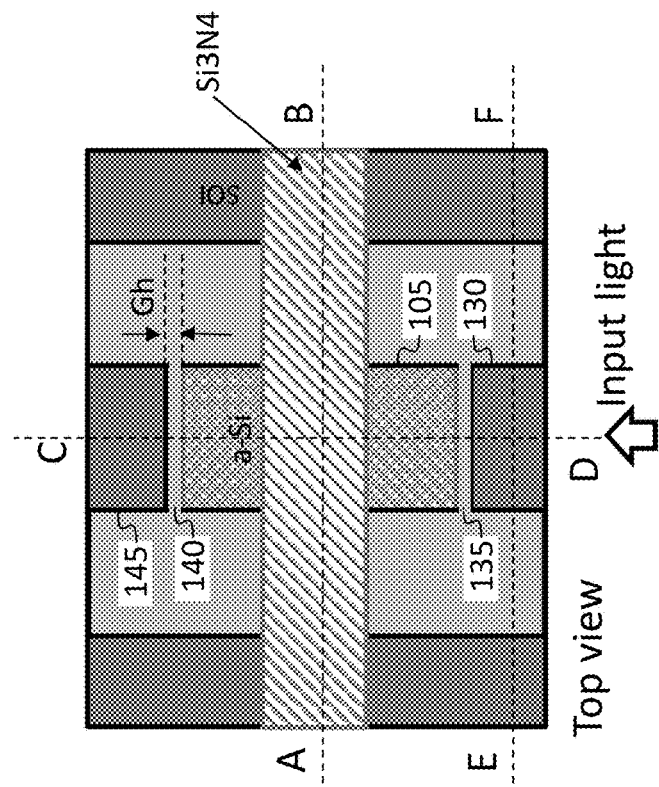
FIG. 1A Top view

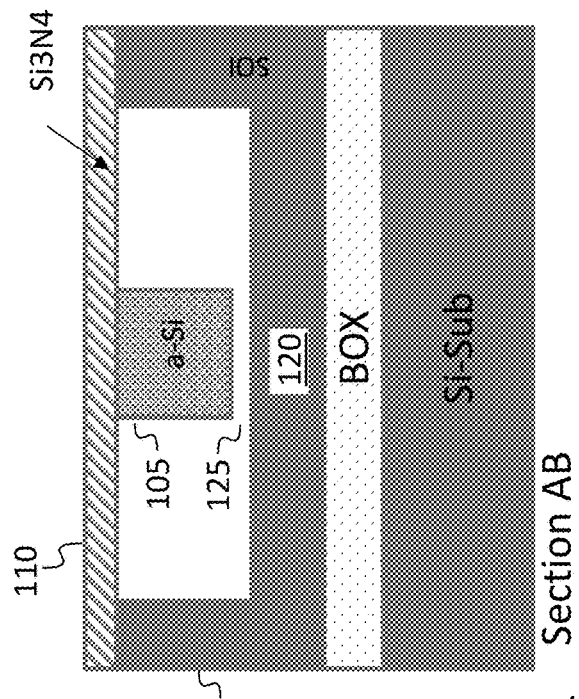
FIG. 1F Section AB
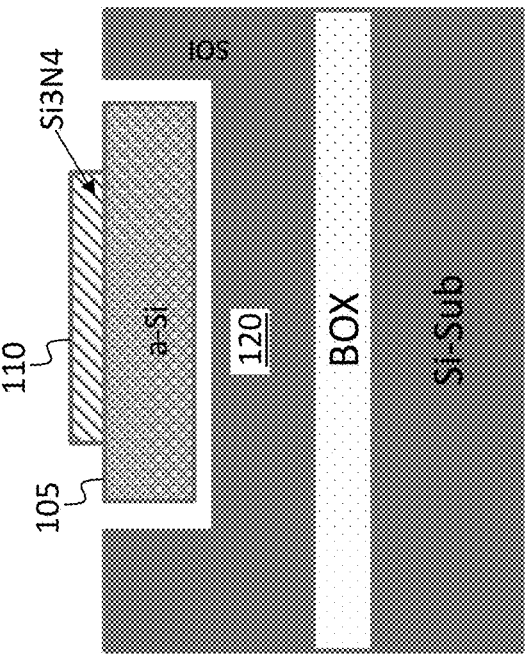
FIG. 1G Section CD
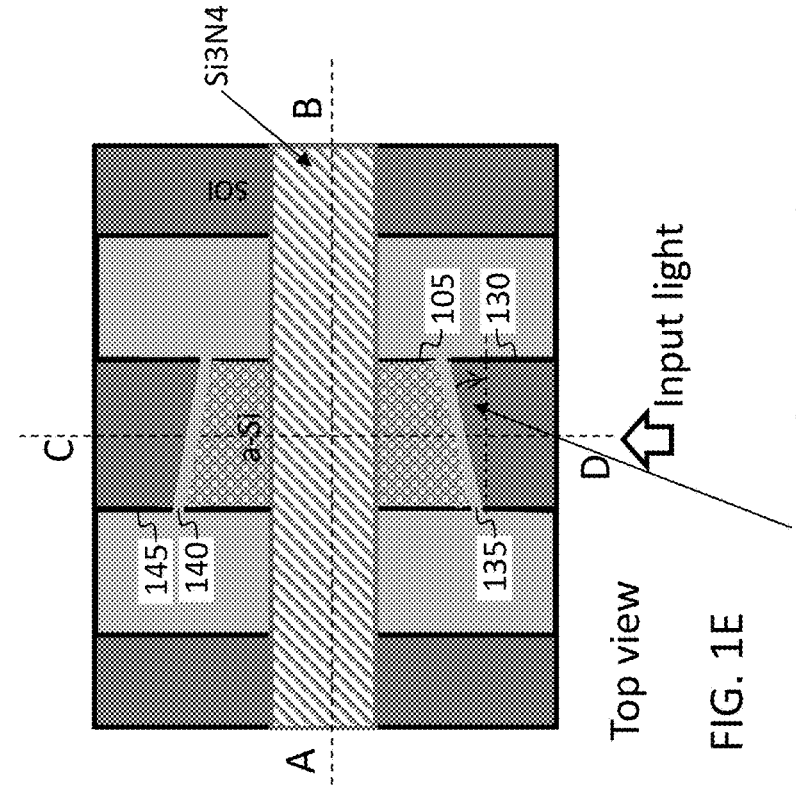
FIG. 1E Top view

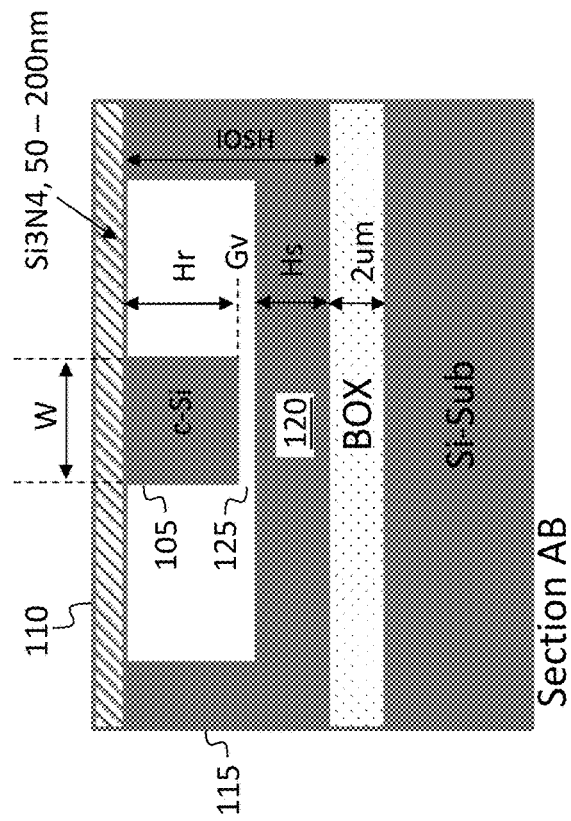
FIG. 1I Section AB
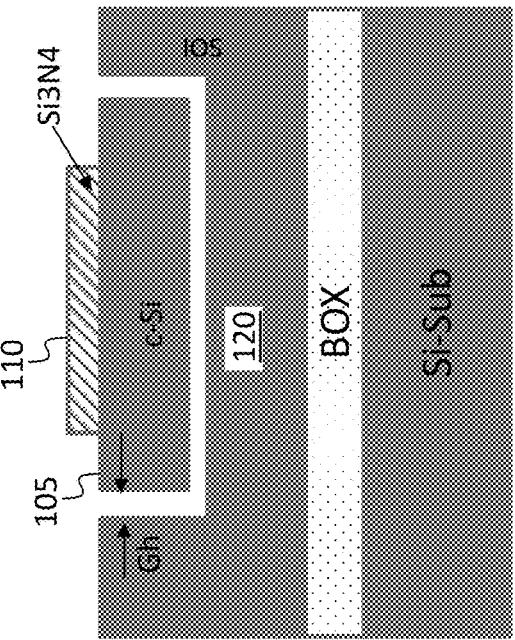
FIG. 1J Section CD
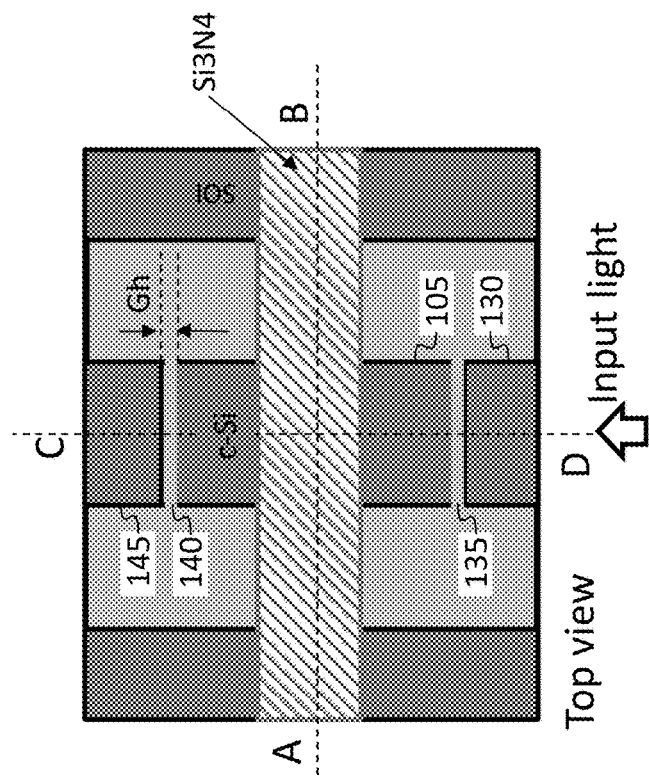
FIG. 1H Top view Section AB Top view Section AB Top view Section AB Top view Section AB Top view Section AB Top view Section AB End of process flow Top view Section AB Top view Section AB Top view Section AB Top view

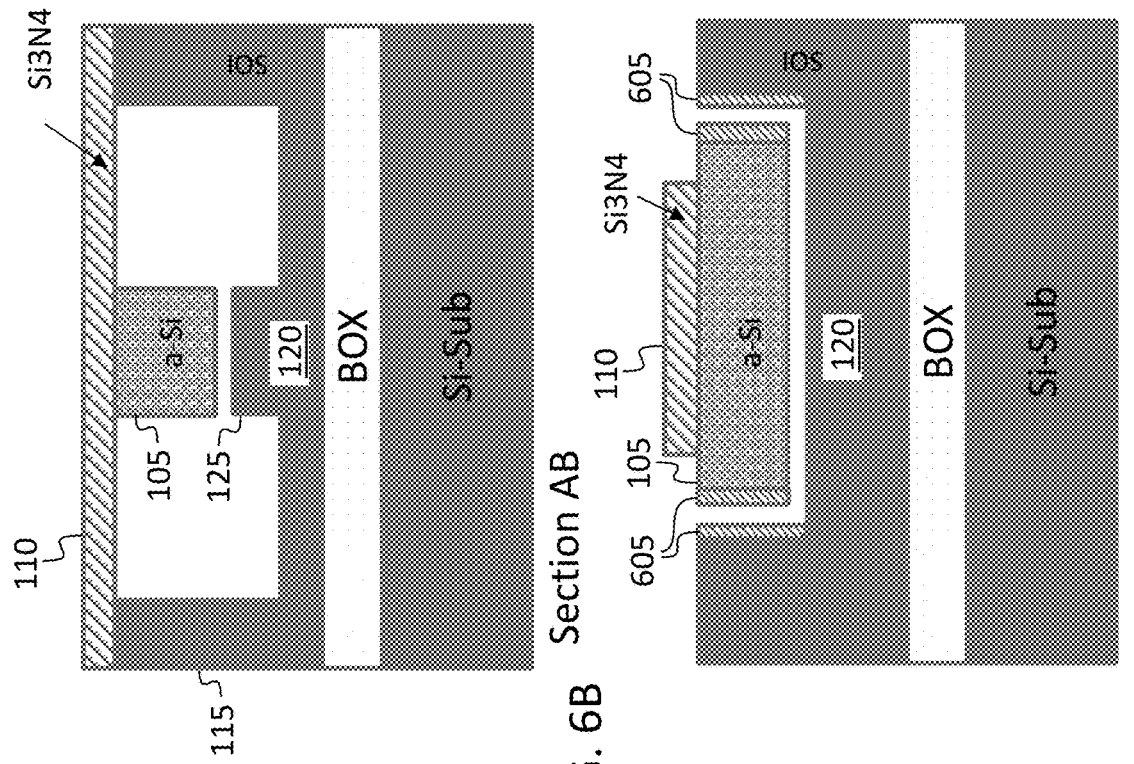
FIG. 6B Section AB
FIG. 6C Section CD
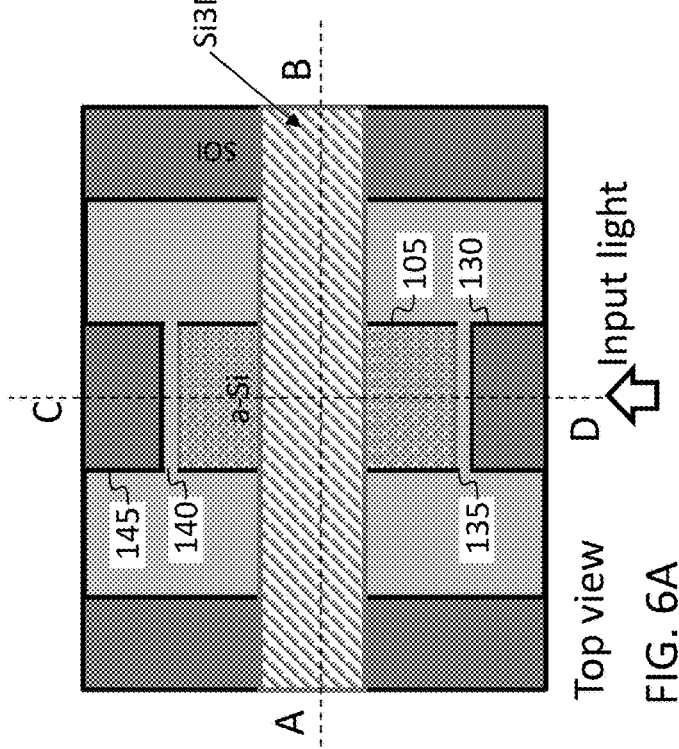
FIG. 6A Top view

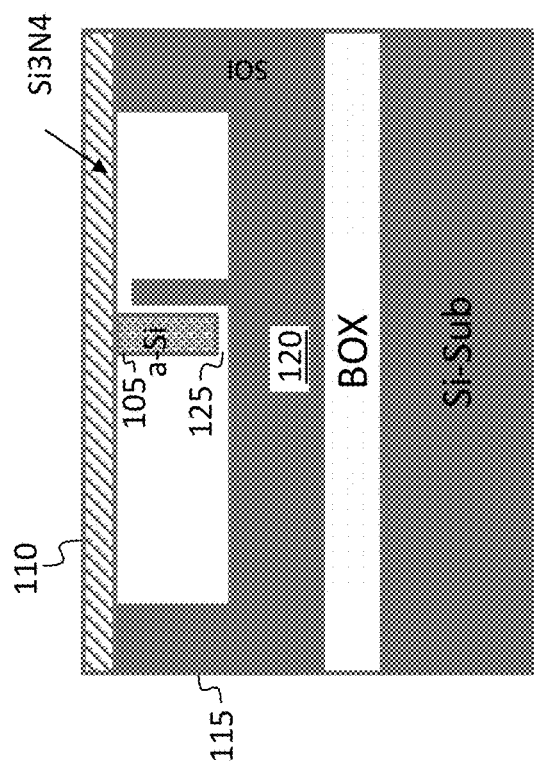
FIG. 6E Section AB
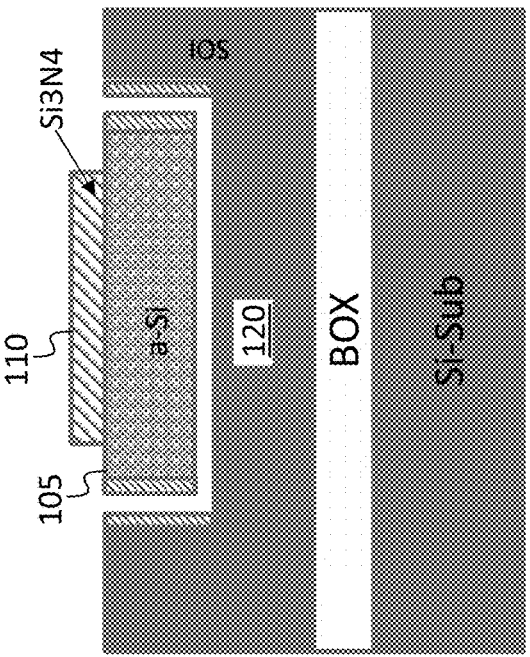
FIG. 6F Section CD
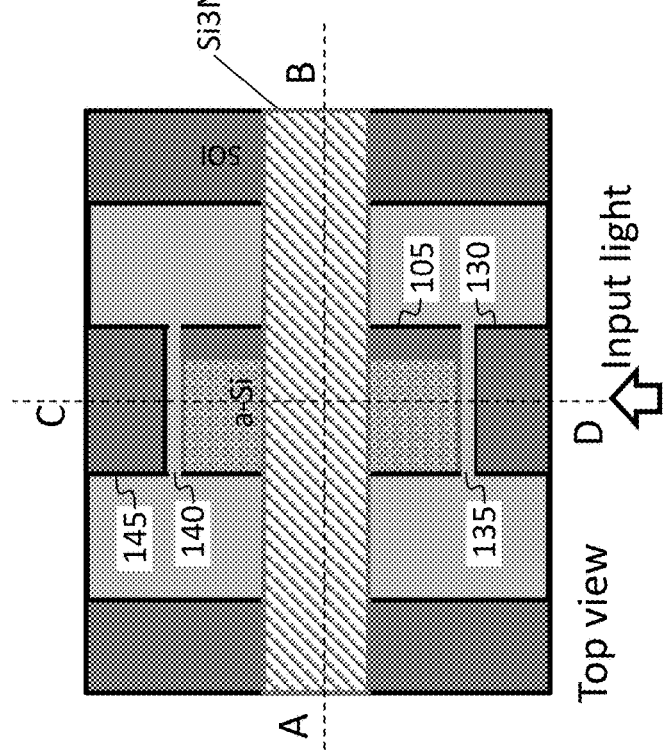
FIG. 6D Top view

FIG. 6H Section AB

FIG. 6I Section CD

Top view

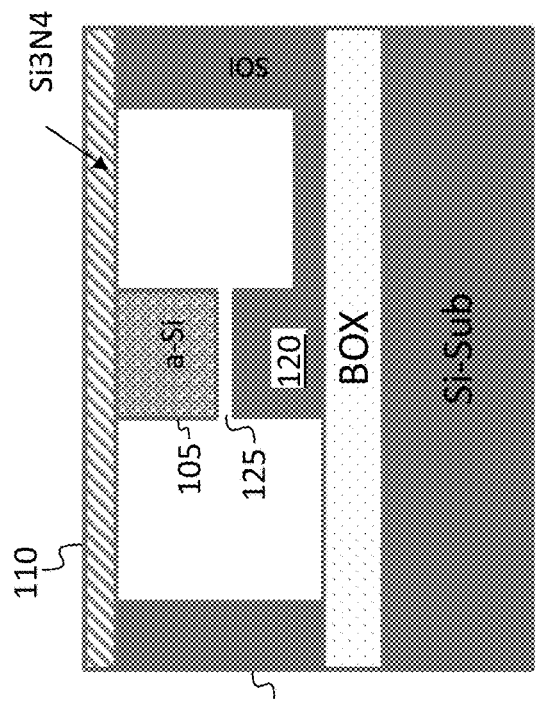
FIG. 6N Section AB
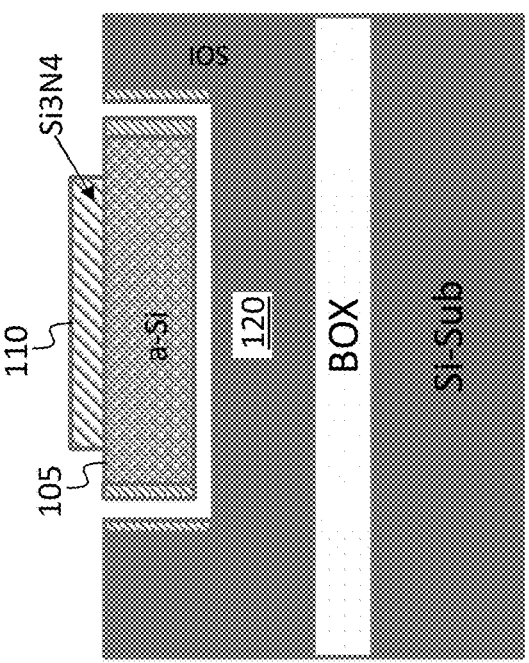
FIG. 6O Section CD
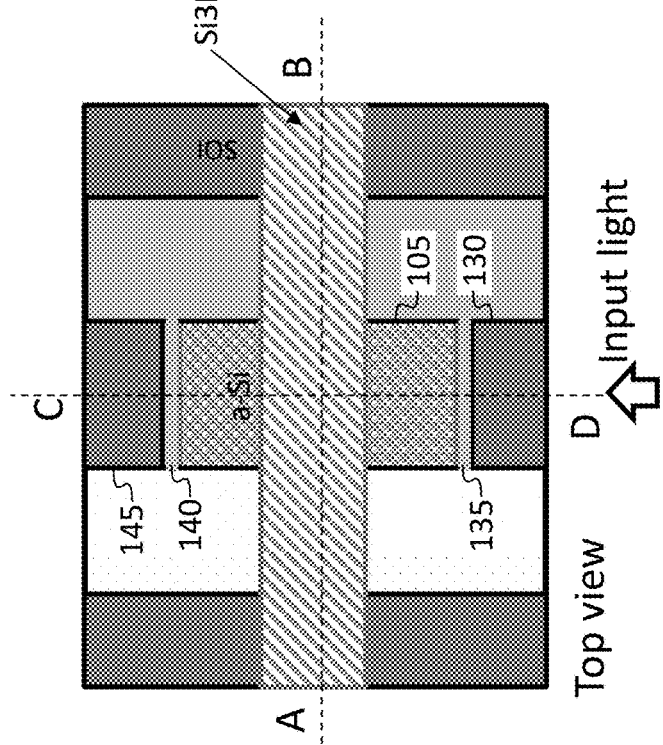
FIG. 6M Top view

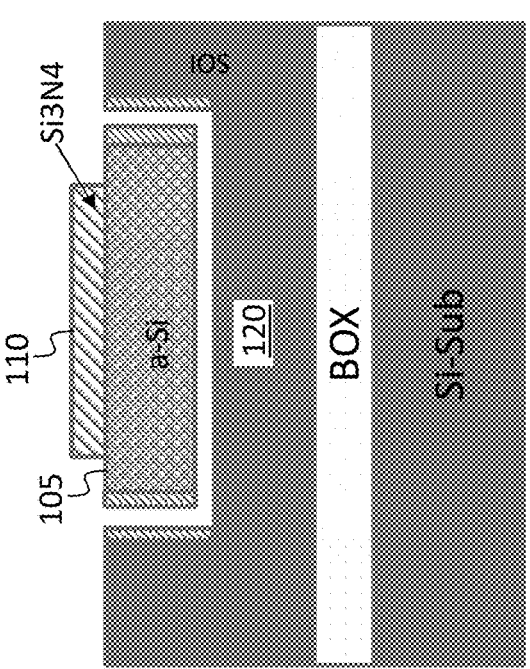
FIG. 6Q Section AB
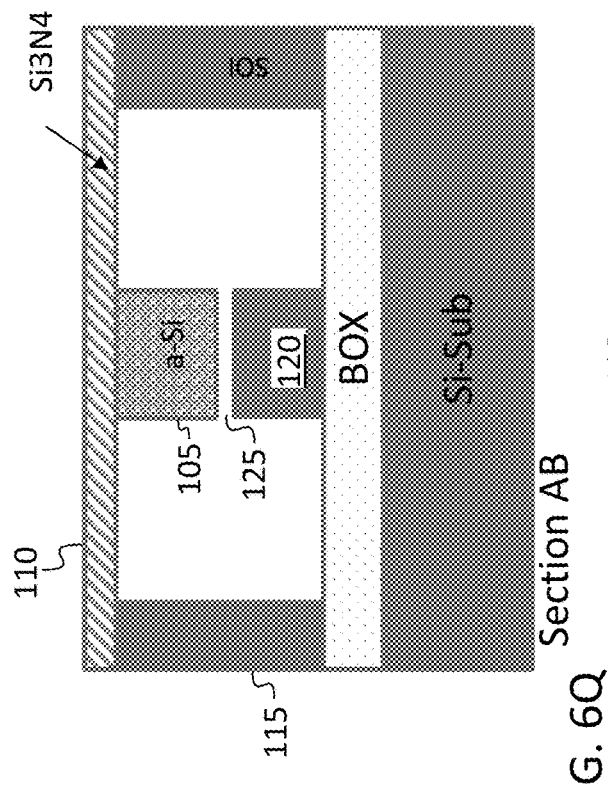
FIG. 6R Section CD
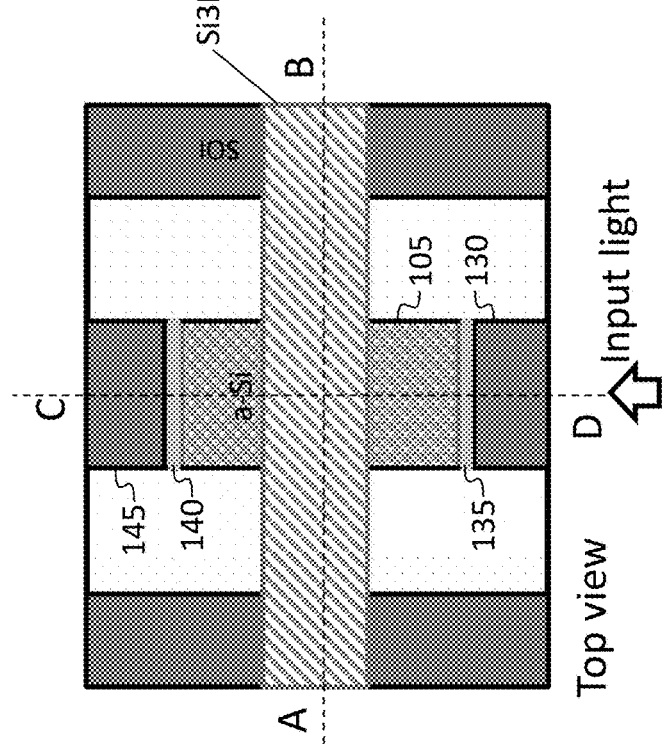
FIG. 6P Top view

PHOTONIC PRESSURE SENSOR

CROSS-REFERENCE TO RELATED APPLICATION(S)

This application claims priority to United Kingdom Patent Application No. 2114380.5, filed in the United Kingdom Intellectual Property Office on Oct. 7, 2021, entitled "PHOTONIC PRESSURE SENSOR", which is incorporated by reference herein in its entirety.

FIELD

One or more aspects of embodiments according to the present disclosure relate to waveguide structures, and more particularly to a waveguide structure configured to operate as a pressure sensor.

BACKGROUND

Compared to piezo-electric acoustic sensors, such as sensors for ultrasound imaging, silicon photonics acoustic sensors may have a sensitivity that is around two orders of magnitude higher. However, related art silicon photonic acoustic sensors may have inherently high optical insertion loss and low yield.

Thus, there is a need for an improved acoustic sensor.

SUMMARY

According to an embodiment of the present disclosure, there is provided a sensor, including: a first waveguide; a flexible support element; and a second waveguide, a first portion of the first waveguide being supported by the flexible support element and separated by a first gap from a second portion of the first waveguide, the flexible support element being capable of bending so as to cause an effective index of refraction of the first waveguide to change, the first waveguide being coupled to the second waveguide through a second gap, the second gap being at an end of the first waveguide and an end of the second waveguide.

In some embodiments, the second waveguide is a waveguide of a photonic integrated circuit.

In some embodiments, the second waveguide is composed of crystalline silicon.

In some embodiments, the first gap is oblique to the first waveguide and to the second waveguide.

In some embodiments, the first waveguide is in a cavity and the flexible support element extends over the cavity.

In some embodiments, the flexible support element is a bridge across the cavity.

In some embodiments, the first portion of the first waveguide is composed of amorphous silicon.

In some embodiments, the first portion of the first waveguide is composed of crystalline silicon.

In some embodiments, the second portion of the first waveguide is composed of crystalline silicon.

In some embodiments, the second portion of the first waveguide is a slab.

In some embodiments, the second portion of the first waveguide includes a rib.

In some embodiments, the second portion of the first waveguide includes a slab, the rib of the second portion of the first waveguide being on the slab.

In some embodiments, the flexible support element is composed of silicon nitride.

In some embodiments, the sensor includes a Mach Zehnder interferometer having a first arm and a second arm, the first waveguide being a portion of the first arm, and the second waveguide being a portion of the first arm.

In some embodiments: the first waveguide is a first portion of a ring resonator; the second waveguide is a second portion of the ring resonator; and the ring resonator is coupled, through a third gap, to a third waveguide.

In some embodiments, when the flexible support element is unbent, the first gap has a width greater than 1 nm and less than 50 nm.

In some embodiments, the second gap has a width greater than 5 nm and less than 100 nm.

In some embodiments, the sensor is hermetically sealed.

According to an embodiment of the present disclosure, there is provided a sensor, including: a first waveguide; a flexible support element; and a second waveguide, the first waveguide being a suspended waveguide including a first portion and a second portion separated by a first gap, the first portion of the first waveguide being supported by the flexible support element, the flexible support element being capable of bending so as to cause an effective index of refraction of the first waveguide to change, the first waveguide being a ring resonator, the second waveguide being a solid waveguide, the first waveguide being coupled to the second waveguide through a second gap.

In some embodiments, the second waveguide is composed of crystalline silicon.

In some embodiments, when the flexible support element is unbent, the first gap has a width greater than 1 nm and less than 50 nm.

According to an embodiment of the present disclosure, there is provided a method for fabricating a sensor, the method including: depositing a sacrificial layer of a first material on a layer of silicon; depositing a silicon member on the sacrificial layer; and removing the sacrificial layer, wherein: the silicon member forms a first portion of a first waveguide, the layer of silicon forms a second portion of the first waveguide, and the first portion of the first waveguide is capable of moving relative to the second portion of the first waveguide so as to cause an effective index of refraction of the first waveguide to change.

In some embodiments: the first material is silicon dioxide, and the sacrificial layer has a thickness greater than 1 nm and less than 50 nm.

In some embodiments, the layer of silicon is at the bottom of a cavity formed in a device layer of a silicon-on-insulator wafer, the method further including: filling the cavity with a sacrificial filling material; depositing a layer of a second material across the cavity and onto the material surrounding the cavity; and removing the sacrificial fill material, such that the first portion of the first waveguide is suspended, by the layer of the second material, in the cavity.

In some embodiments, the removing of the sacrificial layer and the removing of the sacrificial fill material are performed in a single etching operation.

BRIEF DESCRIPTION OF THE DRAWINGS

These and other features and advantages of the present disclosure will be appreciated and understood with reference to the specification, claims, and appended drawings wherein:

FIG. 1A is a top view of a waveguide structure, according to an embodiment of the present disclosure;

FIG. 1B is a cross-sectional view of a waveguide structure, according to an embodiment of the present disclosure;

FIG. 1C is a cross-sectional view of a waveguide structure, according to an embodiment of the present disclosure;

FIG. 1E is a top view of a waveguide structure, according to an embodiment of the present disclosure;

FIG. 1F is a cross-sectional view of a waveguide structure, according to an embodiment of the present disclosure;

FIG. 1G is a cross-sectional view of a waveguide structure, according to an embodiment of the present disclosure;

FIG. 1H is a top view of a waveguide structure, according to an embodiment of the present disclosure;

FIG. 1I is a cross-sectional view of a waveguide structure, according to an embodiment of the present disclosure;

FIG. 1J is a cross-sectional view of a waveguide structure, according to an embodiment of the present disclosure;

FIG. 6A is a top view of a waveguide structure, according to an embodiment of the present disclosure;

FIG. 6B is a cross-sectional view of a waveguide structure, according to an embodiment of the present disclosure;

FIG. 6C is a cross-sectional view of a waveguide structure, according to an embodiment of the present disclosure;

FIG. 6D is a top view of a waveguide structure, according to an embodiment of the present disclosure;

FIG. 6E is a cross-sectional view of a waveguide structure, according to an embodiment of the present disclosure;

FIG. 6F is a cross-sectional view of a waveguide structure, according to an embodiment of the present disclosure;

FIG. 6H is a cross-sectional view of a waveguide structure, according to an embodiment of the present disclosure;

FIG. 6I is a cross-sectional view of a waveguide structure, according to an embodiment of the present disclosure;

FIG. 6M is a top view of a waveguide structure, according to an embodiment of the present disclosure;

FIG. 6N is a cross-sectional view of a waveguide structure, according to an embodiment of the present disclosure;

FIG. 6O is a cross-sectional view of a waveguide structure, according to an embodiment of the present disclosure;

FIG. 6P is a top view of a waveguide structure, according to an embodiment of the present disclosure;

FIG. 6Q is a cross-sectional view of a waveguide structure, according to an embodiment of the present disclosure; and FIG. 6R is a cross-sectional view of a waveguide structure, according to an embodiment of the present disclosure.

Each of the drawings is drawn to scale for a respective embodiment.

DETAILED DESCRIPTION

The detailed description set forth below in connection with the appended drawings is intended as a description of exemplary embodiments of a pressure sensor provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, a photonic pressure sensor (e.g., an acoustic sensor, such as an ultrasonic sensor) includes an optical waveguide (or simply "waveguide") structure in which a first portion of a first waveguide is supported by a flexible support element that deforms under the pressure of an acoustic wave incident on the sensor. The deformation of the flexible support element causes the first portion of the first waveguide to move, resulting in a change in a gap (e.g., an air gap) between the first portion of the first waveguide and a second portion of the first waveguide. When the gap changes, the propagation characteristics (e.g., the effective index of refraction, or the loss) of the first waveguide change; such changes may be measured, to sense a change in pressure or an acoustic wave incident on the sensor.

Figure 1D:
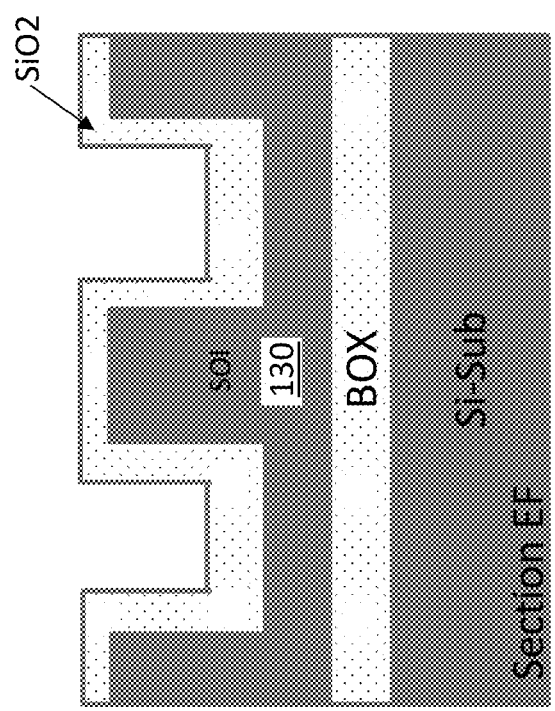
FIG. 1D is a cross-sectional view of a waveguide structure, according to an embodiment of the present disclosure.

For example, referring to FIG. 1A-1D (of which FIG. 1A is a top view and FIGS. 1B, 1C, and 1D are cross-sectional views taken along the lines A-B, C-D, and E-F, respectively), the first portion 105 of the first waveguide is suspended from the flexible support element 110, in a cavity in the device layer (or "SOI layer") 115 of a silicon on insulator (SOI) wafer (which also includes a buried oxide (BOX) layer and a silicon substrate ("Si-Sub")). The first portion 105 of the first waveguide is separated from a second portion 120 of the first waveguide (the silicon at the bottom of the cavity) by a first gap 125, the first gap being between a bottom surface of the first portion and a top surface of the second portion. In the configuration of FIGS. 1A-1D, the first waveguide is a rib waveguide including a rib portion (the first portion 105 of the first waveguide) on a slab portion (the second portion 120 of the first waveguide) with the first gap 125 separating the rib portion and the slab portion. The rib portion may have a rectangular cross section, and it may have a top surface and two walls, or "sidewalls". The first waveguide may be referred to as a suspended waveguide. As used herein, a "suspended waveguide" is a waveguide a portion of which is suspended from a flexible support element and which moves relative to a second portion of the suspended waveguide when the flexible support element flexes, or "bends". A waveguide which does not have a gap separating it into a first (e.g., suspended) portion and a second portion, such as the second waveguide 130, may be referred to as a "solid" waveguide. When the flexible support element 110 bends (or "flexes") downward, e.g., as a result of the pressure of an acoustic wave, the first portion 105 of the first waveguide moves downward and the width of the first gap 125 is decreased. This decrease in the width of the first gap 125 may decrease the phase velocity of light propagating in the first waveguide, i.e., it may increase the effective index of refraction of the first waveguide. The flexible support element 110 may be composed of silicon nitride (e.g., Si3N4, which may be amorphous Si3N4, formed by Plasma Enhanced Chemical Vapor Deposition (PECVD) at 300° C.-350° C.) or of any other suitable material (e.g., SiO2) having an index of refraction that is sufficiently low (relative to the index of refraction of the first portion 105 of the first waveguide) to avoid significantly perturbing the mode of the first waveguide. The flexible support element 110 may be a rectangular element forming a bridge across the top of the cavity (e.g., as shown in the embodiment of FIGS. 1A-1D) or it may have a different shape (e.g., the shape of an "X") or it may be cantilevered over the cavity from one side, or supported from more than two sides of the cavity.

Light may be coupled into the first waveguide, at a first end of the first waveguide, from a second waveguide 130, which may also be a rib waveguide, through a second gap 135, which separates the rib portion of the first waveguide from the rib portion of the second waveguide. The light may then propagate through the first waveguide and through a third gap 140 into a third waveguide 145 (alternatively, the second waveguide 130 and the third waveguide 145 may be considered to be a single waveguide having a gap sufficiently long to fit the first waveguide). In some embodiments the end surfaces of the first, second, and third waveguides may have antireflection coatings 605 (FIG. 6C). As used herein, "coupled through a gap" means coupled at least in part through a gap, and one waveguide may be coupled to another waveguide through a (transverse) gap if the gap extends at least part-way between the waveguides (as in the embodiment of FIGS. 1A-1D, in which, at an end of the first waveguide and an end of the second waveguide, the second gap 135 extends between the rib portions but not between the slab portions of the waveguides). The first portion 105 of the first waveguide may be composed of amorphous silicon; the second portion 120 of the first waveguide, as well as the second waveguide 130 and the third waveguide 145, may be composed of crystalline silicon. A silicon dioxide (or "SiO2", or simply "oxide") layer may cover the second waveguide 130 as shown in FIG. 1D. The second waveguide 130 and the third waveguide 145 (or the second waveguide 130 and the third waveguide 145, except for a portion of each that is near the first waveguide) may be covered by a layer of oxide, to prevent surface contamination (e.g., with dust) from introducing optical loss.

In some embodiments, dimensions of the components of the pressure sensor are (or are each within 50% of) any the following: the thickness of the device layer (or "SOI thickness", HSOI) may be 500 nm, (or 350 nm, or 220 nm, or any value between 220 nm and 500 nm), the slab thickness (Hs) may be 200 nm, (or 140 nm, or 90 nm, or any value between 90 nm and 200 nm), the width of the first gap 125 (Gv) (when the flexible support element 110 is unbent) may be 20 nm, or any value between 5 nm and 50 nm, the height (Hr) (or thickness) of the first portion 105 of the first waveguide may be 280 nm (or 190 nm, or 110 nm, or any value between 110 nm and 280 nm), the width (W) of the first portion 105 of the first waveguide may be 600 nm (or 500 nm, or 300 nm, or any value between 300 nm and 600 nm), the width (Gh) of the second gap 135 may be between 10 nm and 50 nm, and the thickness of the flexible support element 110 may be between 100 nm and 450 nm, e.g., 200 nm. As used herein, when the flexible support element 110 is "unbent" it means that the flexible support element 110 is in the shape it has in the absence of external forces (e.g., external forces due to pressure from incident acoustic waves); does not necessarily mean that the flexible support element 110 is straight.

In some embodiments, if the first waveguide is sufficiently long (e.g., longer than 100 microns), the second gap may be absent, and the first portion 105 of the first waveguide may be continuous with the second waveguide 130 (e.g., the first portion 105 of the first waveguide and the rib of the second waveguide 130 may be a single monolithic structure). In such an embodiment, the flexible support element 110 may be absent, and the first portion 105 of the first waveguide may bend under the force of pressure changes (e.g., due to acoustic waves), changing the width of the first gap 125.

FIGS. 1E-1G show an embodiment that is similar to that of FIGS. 1A-1D, differing from the embodiment of FIGS. 1A-1D in that the second gap 135 and the third gap 140 are oblique to the ribs of the first, second and third waveguides. The angle between each of the second gap 135 and the third gap 140 and the centerline of the waveguides may be between 80 degrees and 90 degrees (i.e., each of the second gap 135 and the third gap 140 may be between 0 and 10 degrees from being perpendicular to the centerline of the waveguides). In an embodiment such as that of FIGS. 1E-1G, in which the gaps are oblique to the waveguides, reflections from the gaps may be reduced.

FIGS. 1H-1J show an embodiment that is similar to that of FIGS. 1A-1D, differing from the embodiment of FIGS. 1A-1D in that the first portion 105 of the first waveguide is composed of crystalline silicon (e.g., it may be between 60 at % (atomic percent) and 100 at % silicon, and it may be between 60% and 100% crystalline (by volume)).

Figure 2A:
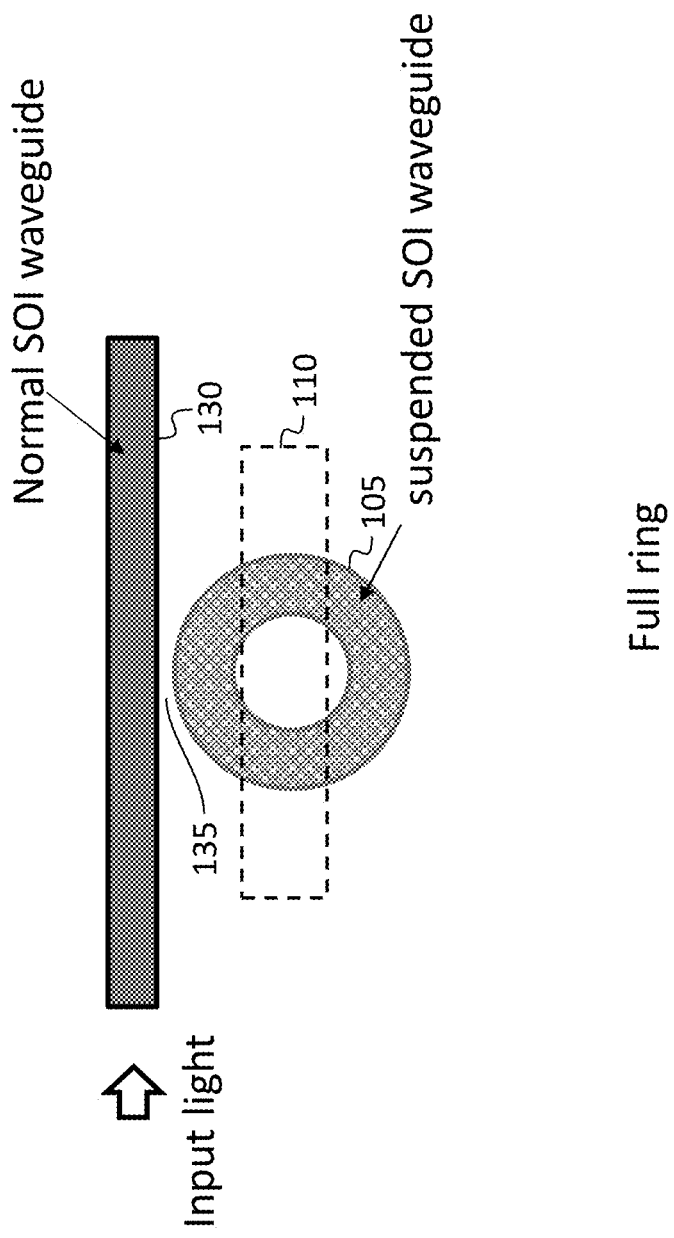
FIG. 2A is a top view of a waveguide structure, according to an embodiment of the present disclosure.
Figure 2B:
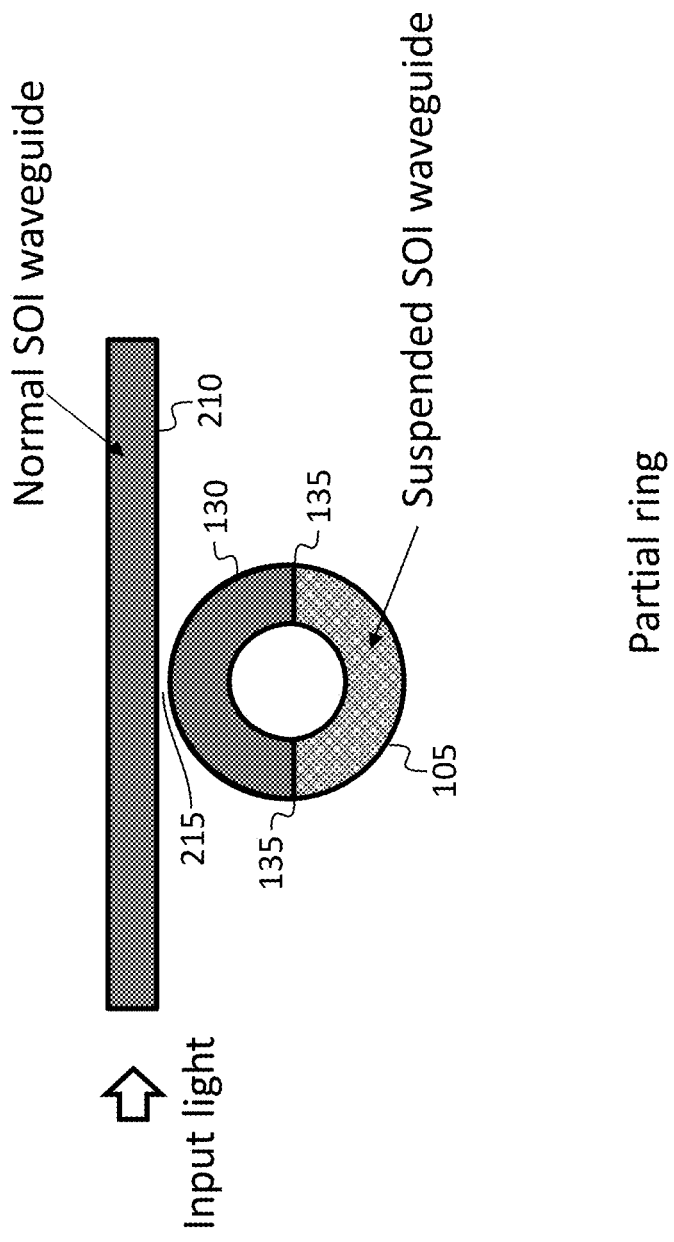
FIG. 2B is a top view of a waveguide structure, according to an embodiment of the present disclosure.
Figure 2C:
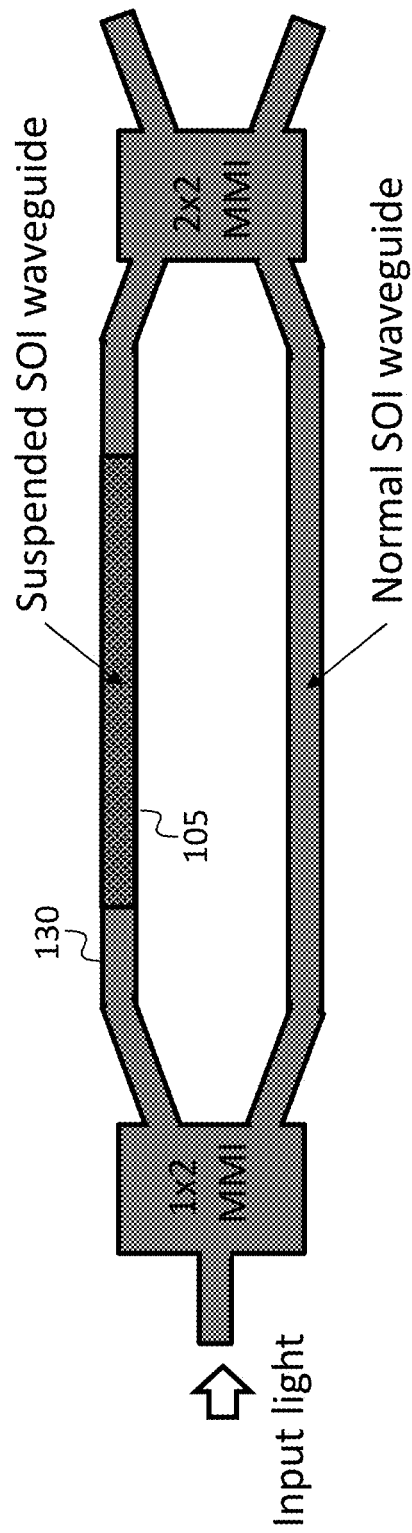
FIG. 2C is a top view of a waveguide structure, according to an embodiment of the present disclosure.

FIGS. 2A-2C show photonic integrated circuits (PICs) each of which may be employed to sense pressure changes (e.g., acoustic waves) by sensing changes in the intensity of the light transmitted through the PIC. In FIG. 2A, a ring resonator formed of a first waveguide includes (e.g., consists of) a first portion 105 suspended from a flexible support element 110 and a second portion 120 (not separately illustrated) below the first portion 105. A possible location for the flexible support element 110 is shown as a dashed rectangle. The first waveguide may be within a cavity (not shown); the walls of this cavity may support the ends of the flexible support element 110. As in the embodiment of FIGS. 1A-1D, the first waveguide may be a rib waveguide. The first portion 105 of the first waveguide may be the (ring-shaped) rib of the rib waveguide and the second portion 120 of the first waveguide may be the slab portion of the first waveguide. The second waveguide 130 may be close to the first waveguide as shown, separated by a second gap 135 from the first waveguide, the second gap 135 being between a sidewall of the first waveguide and a sidewall of the second waveguide 130. The resonant wavelength of the ring resonator may change when the pressure change of an acoustic wave changes the width of the first gap 125, thereby changing the effective index of refraction of the first waveguide.

If the light (the "input light") propagating in the second waveguide 130 has a wavelength offset slightly from the nominal resonant wavelength of the ring resonator (the "nominal" resonant wavelength of the ring resonator being its resonant wavelength in the absence of acoustic waves or other pressure changes, relative to a nominal operating pressure), then the intensity of the light transmitted from the input, past the ring resonator, may change as the pressure changes. If the wavelength of the input light is equal to the nominal resonant wavelength of the ring resonator, then the phase of the light transmitted from the input, past the ring resonator, may change as the pressure changes. In such a case the second waveguide may be included in one arm of a Mach Zehnder interferometer (e.g., a Mach Zehnder interferometer configured to have substantially equal light at both outputs in the absence of pressure changes), so that the intensity of light at the outputs of the Mach Zehnder interferometer changes when a pressure change causes a change in the effective index of refraction of the first waveguide.

Figure 2D:
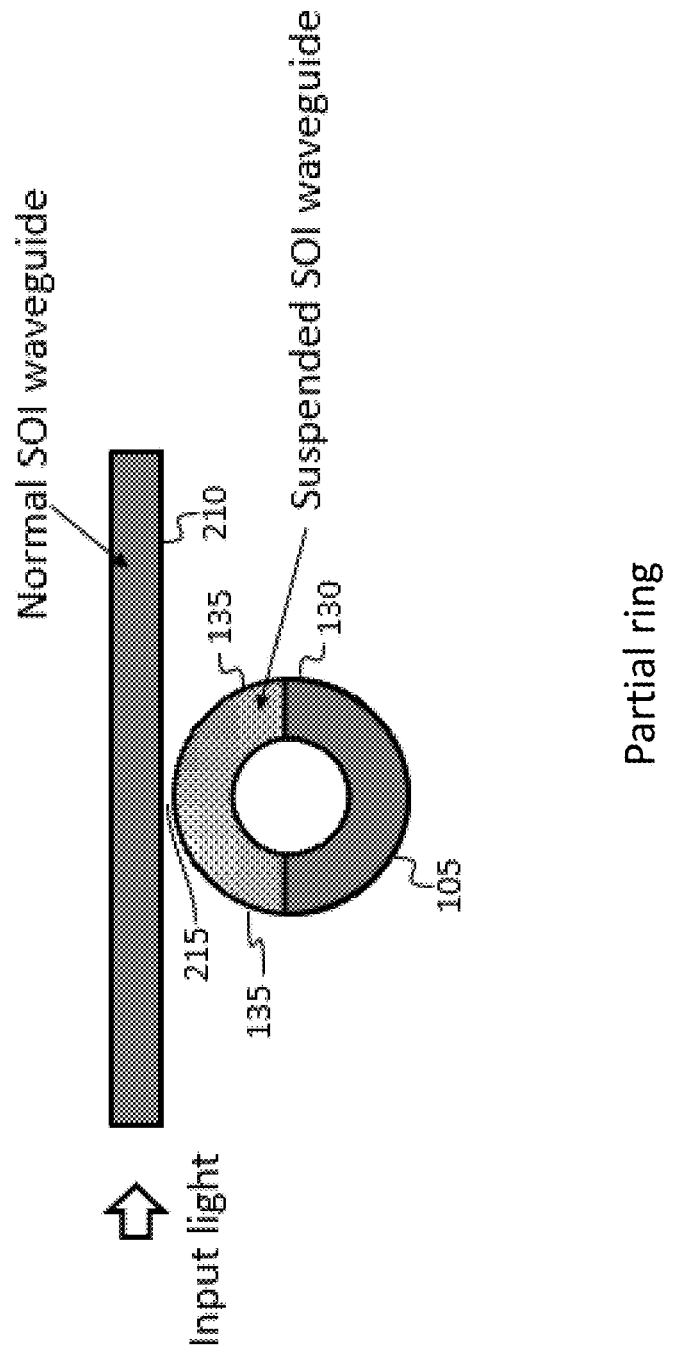
FIG. 2D is a top view of a waveguide structure, according to an embodiment of the present disclosure.

The embodiments of FIGS. 2B and 2D are similar to that of FIG. 2A, differing from the embodiment of FIG. 2A in that a first portion of the ring resonator is a first waveguide, which is a suspended waveguide (of which only the first portion 105 is illustrated). The remainder of the ring resonator is a second waveguide 130, coupled to the first waveguide through two second gaps 135 at the ends of the first waveguide and the second waveguide. A third waveguide 210 is coupled to the ring resonator through a third gap 215, between a sidewall of the third waveguide 210 and a sidewall of the ring resonator. The third waveguide 210 may be substantially straight as shown, or it may be curved (e.g., it may be another ring resonator). The third waveguide 210 may be coupled, through the third gap 215, (i) to the first waveguide (if, as shown in FIG. 2D, the portion of the ring resonator near the third waveguide 210 is a portion of the first waveguide), (ii) to the second waveguide 130 (if, as shown in FIG. 2B, the portion of the ring resonator near the third waveguide 210 is a portion of the second waveguide 130), or (iii) to both the first waveguide and the second waveguide 130 (if the portion of the ring resonator near the third waveguide 210 includes both a portion of the first waveguide and a portion of the second waveguide 130).

In the embodiment of FIG. 2C, a suspended waveguide (e.g., a suspended waveguide such as that of FIGS. 1A-1D, FIGS. 1E-1G, or FIGS. 1H-1J) is included in one arm of a Mach Zehnder interferometer (e.g., a Mach Zehnder interferometer configured to have substantially equal light at both outputs in the absence of pressure changes), so that the intensity of light at the outputs of the Mach Zehnder interferometer changes when, e.g., the pressure of an acoustic wave changes the effective index of refraction of the first waveguide.

Figure 3A:
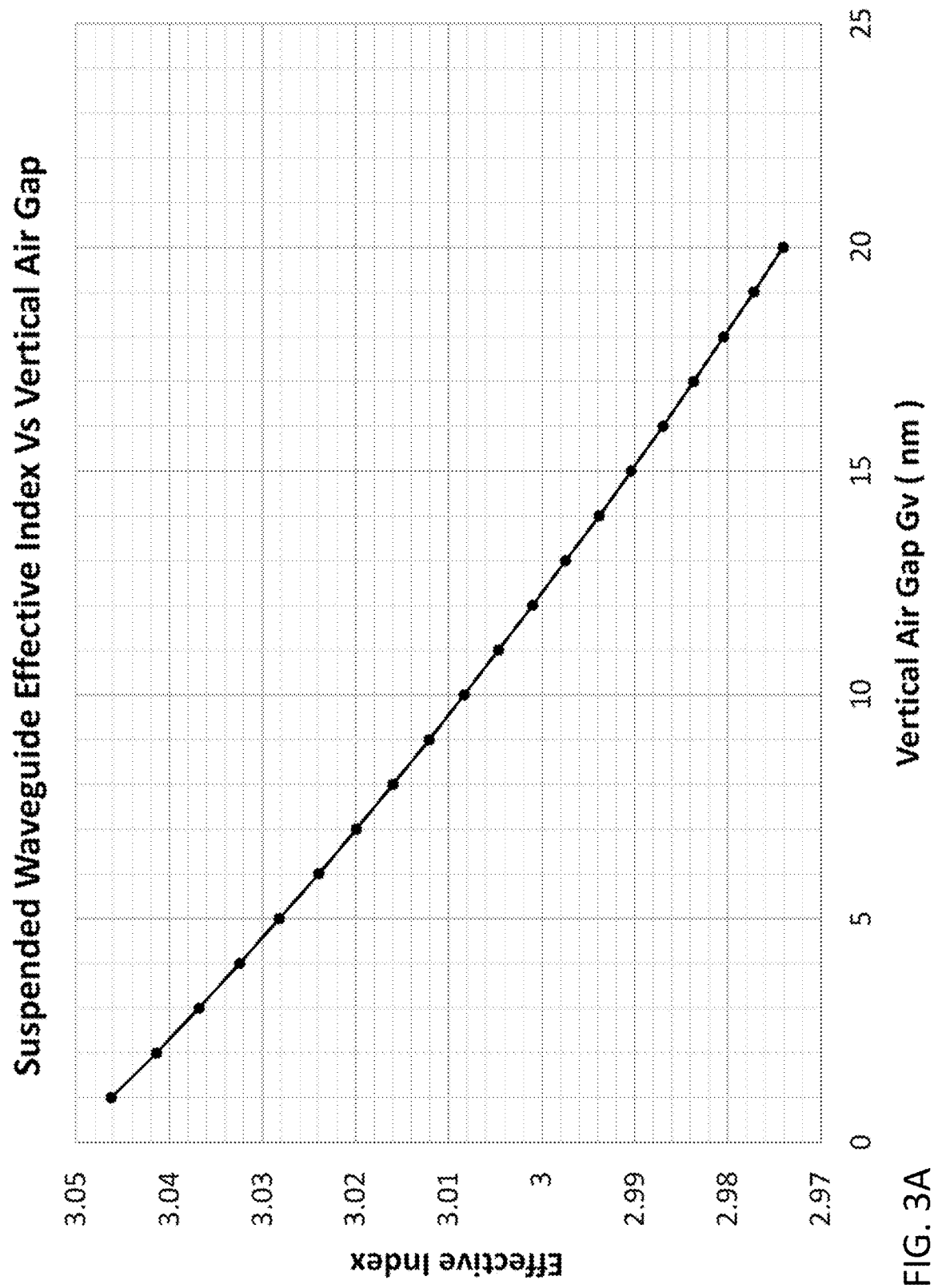
FIG. 3A is a graph of effective index of refraction as a function of the width of a first gap, according to an embodiment of the present disclosure.
Figure 3B:
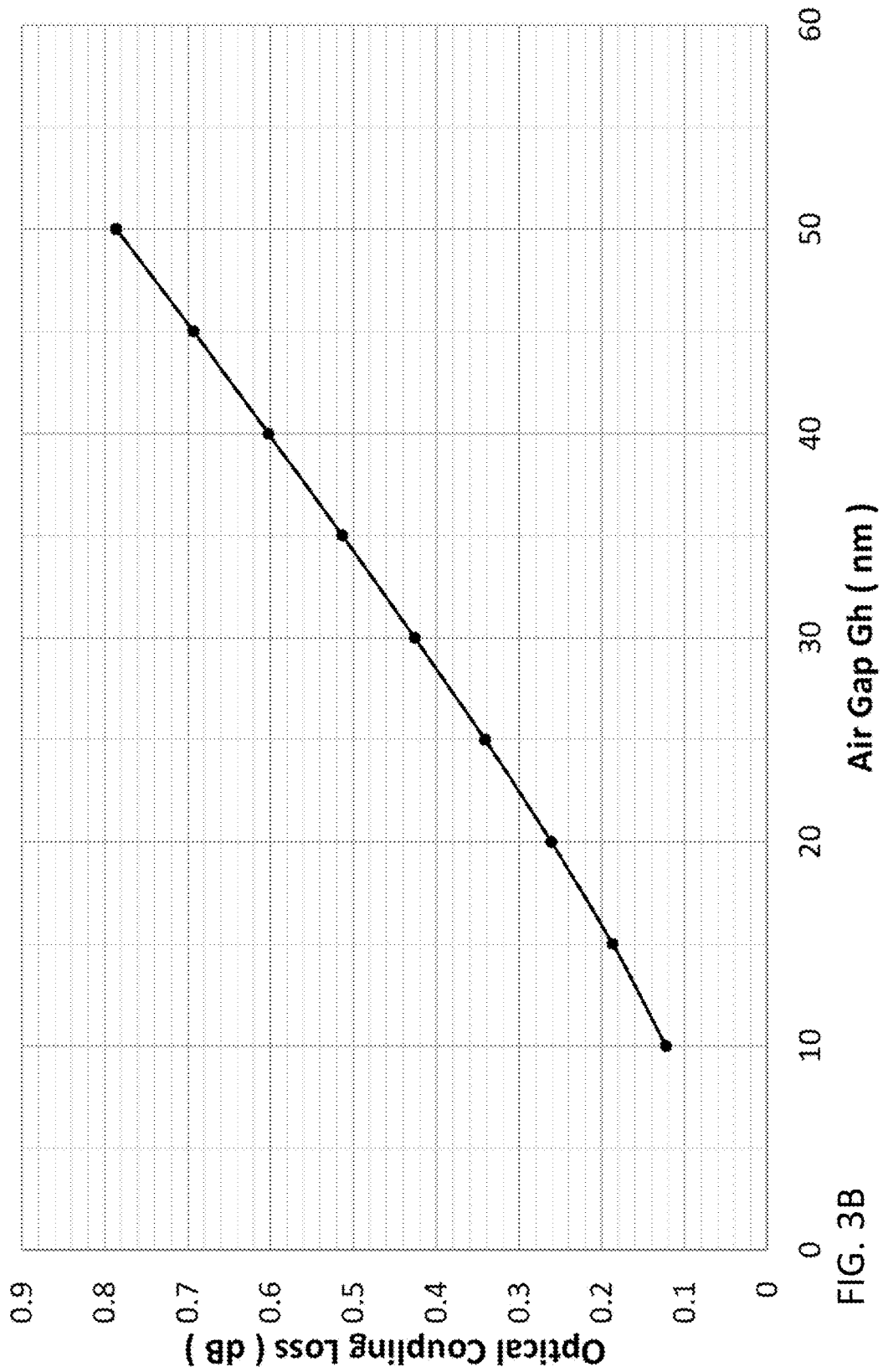
FIG. 3B is a graph of coupling loss as a function of the width of a second gap, according to an embodiment of the present disclosure.

FIG. 3A is a graph of calculated values of the effective index of refraction of a suspended waveguide as a function of the width Gv of the first gap 125 (the gap between the first portion 105 of the suspended waveguide and the second portion 120 of the suspended waveguide). It may be seen that for gap widths from 1 nm to 20 nm, the graphed curve is nearly linear, i.e., the rate of change of effective index of refraction with gap width varies relatively little over the range of gap widths shown. FIG. 3B is a graph of calculated values, as a function of the width Gh of the second gap 135, of the optical coupling loss for light propagating from the second waveguide 130 to the first waveguide. It may be seen that for gap widths from 10 nm to 50 nm, the graphed curve is nearly linear. The calculations resulting in the graphs of FIGS. 3A and 3B were performed using commercial finite-difference time-domain (FDTD) photonics analysis software, using the following parameter values:

Width (W) of the first portion 105 of the first waveguide: 600 nm

Thickness (Hs) of the second portion 120 of the first waveguide: 200 nm

Thickness (Hr) of the first portion 105 of the first waveguide: 280 nm

Thickness of the flexible support element 110: 200 nm

Wavelength: 1550 nm

Index of refraction of amorphous silicon: 3.42

For the graph of FIG. 3B, the width (Gv) of the first gap 125 was set to 20 nm.

Figure 6G:
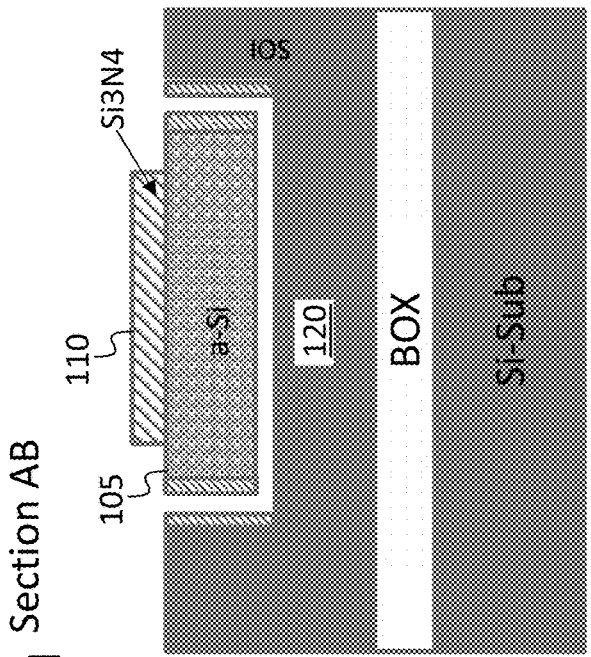
FIG. 6G is a top view of a waveguide structure, according to an embodiment of the present disclosure.
Figure 6G:
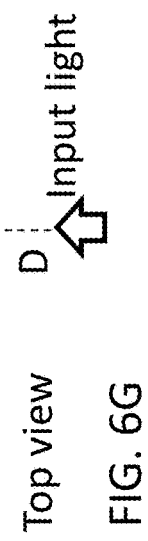
Figure 6G:
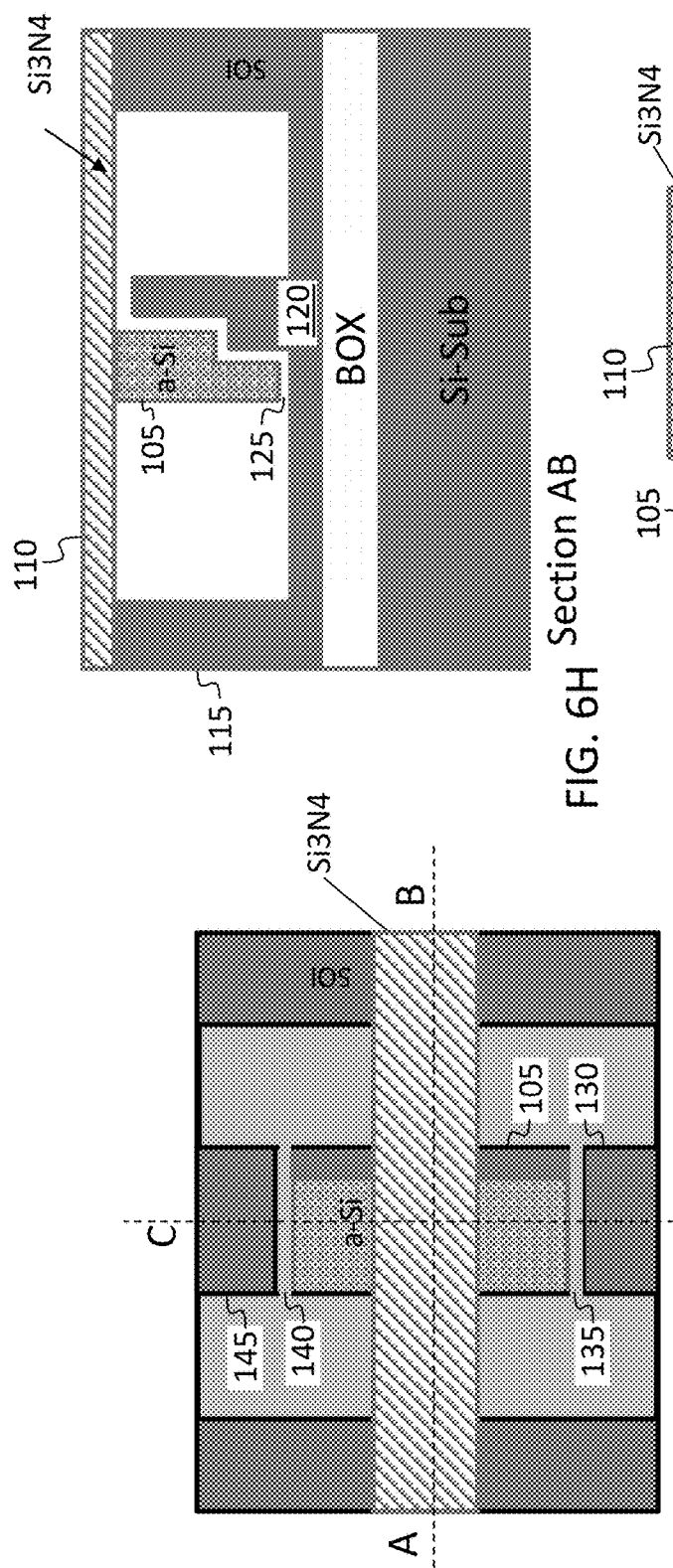

In some embodiments, some or all of the following features are present. The SOI thickness (i.e., the thickness of the device layer) may be 220 nm, 350 nm, or 500 nm, or any other thickness (e.g., a thickness between 220 nm and 500 nm). The suspended SOI waveguide may be made in a cavity in the SOI platform. There may be at least one air gap between the normal (solid) SOI waveguide and suspended SOI waveguide at the boundary in the horizontal direction, which has an angle of between 0 and 10 degrees to a line parallel to the substrate and perpendicular to the light propagation direction. The suspended waveguide either has a slab, or no slab. If there is a slab, the slab is on the bottom of the waveguide, in other words, the suspended waveguide may have the shape of an inverted T. If there is no slab, the suspended waveguide may be a strip waveguide (e.g., a rectangular strip of (amorphous or crystalline) silicon on the BOX layer) including a first portion (supported by the flexible support element 110) and a second portion separated from the first portion by a gap (e.g., as illustrated in FIGS. 6P-6R). The suspended SOI waveguide may include a rib with an air gap in it. The air gap may separate the SOI waveguide (e.g., the SOI rib waveguide) into two parts, either horizontally, or vertically, or a combination of horizontally and vertically (e.g., as in FIGS. 6D-6L). The rib of the suspended SOI waveguide may be composed of amorphous silicon, or crystalline silicon, or any other suitable material or materials, such as group IV, III-V, or II-VI semiconductors, or a dielectric material that has an optical refractive index of at least 2.5. The optical operating wavelength may be O-band, S-band, C-band, L-band or any other infrared (IR) wavelength. The platform may be an SOI platform, or a dielectric platform, such as a silicon nitride platform, in which the normal waveguide and suspended waveguide may be made of silicon or other dielectric materials. The optical operating wavelength range may be visible wavelengths, UV wavelengths, or near IR wavelengths. A pressure sensor may be constructed as a micro-ring resonator whose ring has either a full suspended waveguide structure (FIG. 2A) or a partial suspended waveguide structure (FIG. 2B). A pressure sensor may also be constructed as a Mach Zehnder interferometer with one of its arms including a suspended waveguide structure. Applications for the embodiments disclosed herein include acoustic wave detection (e.g., in photonic acoustic sensors) and pressure detection (e.g., in photonic pressure sensors), and the detection and measurement of acceleration (e.g., in a sensor configured to operate as an accelerometer).

Figure 4B:
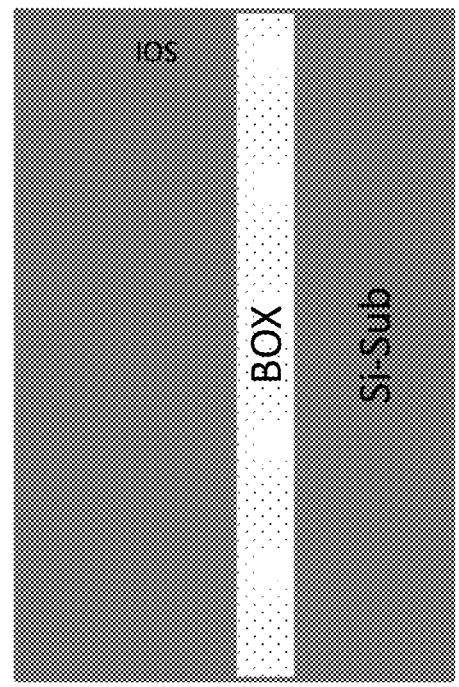
FIG. 4B is a cross-sectional view of an intermediate product in a process for fabricating a waveguide structure, according to an embodiment of the present disclosure.
Figure 4A:
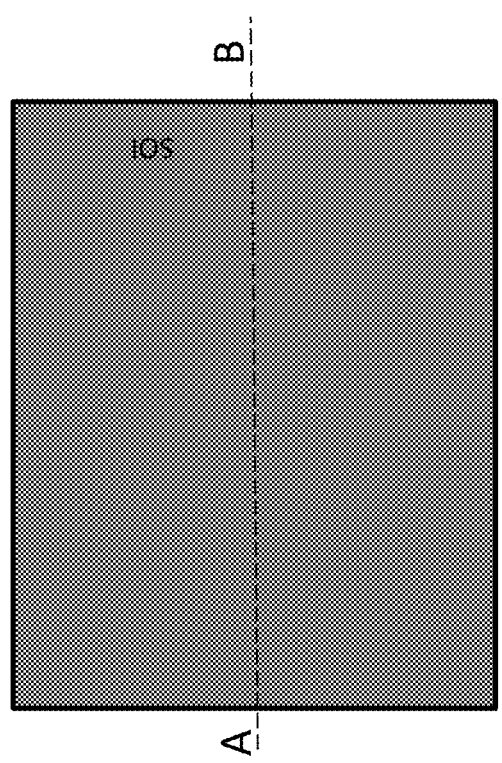
FIG. 4A is a top view of an intermediate product in a process for fabricating a waveguide structure, according to an embodiment of the present disclosure.
Figure 4D:
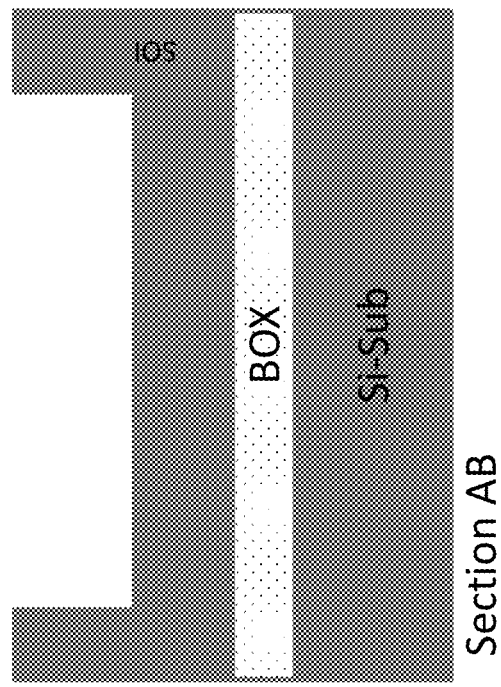
FIG. 4D is a cross-sectional view of an intermediate product in a process for fabricating a waveguide structure, according to an embodiment of the present disclosure.
Figure 4C:
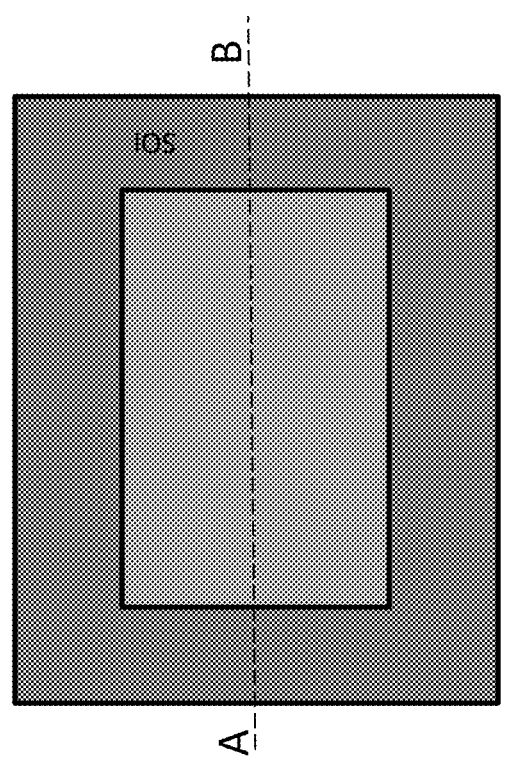
FIG. 4C is a top view of an intermediate product in a process for fabricating a waveguide structure, according to an embodiment of the present disclosure.
Figure 4F:
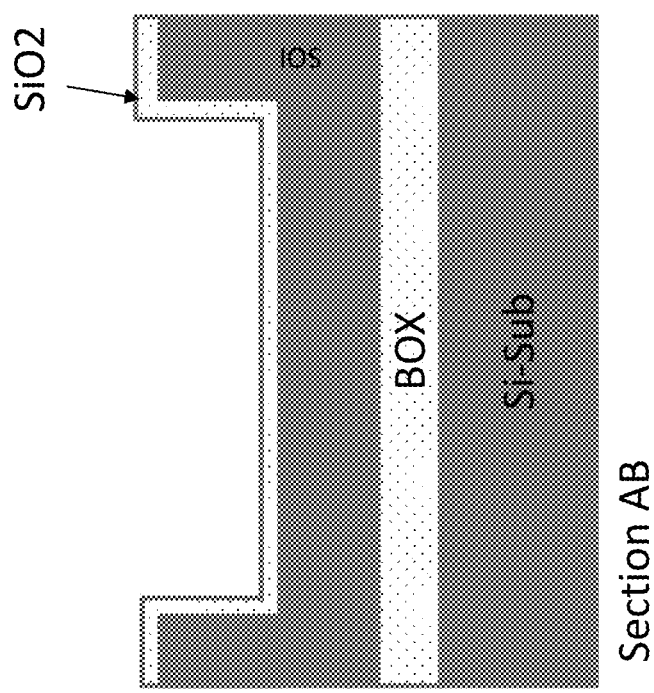
FIG. 4F is a cross-sectional view of an intermediate product in a process for fabricating a waveguide structure, according to an embodiment of the present disclosure.
Figure 4E:
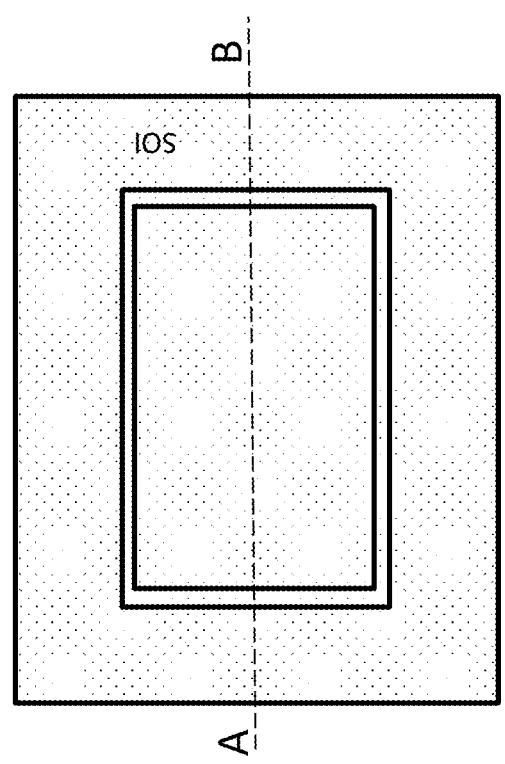
FIG. 4E is a top view of an intermediate product in a process for fabricating a waveguide structure, according to an embodiment of the present disclosure.
Figure 4H:
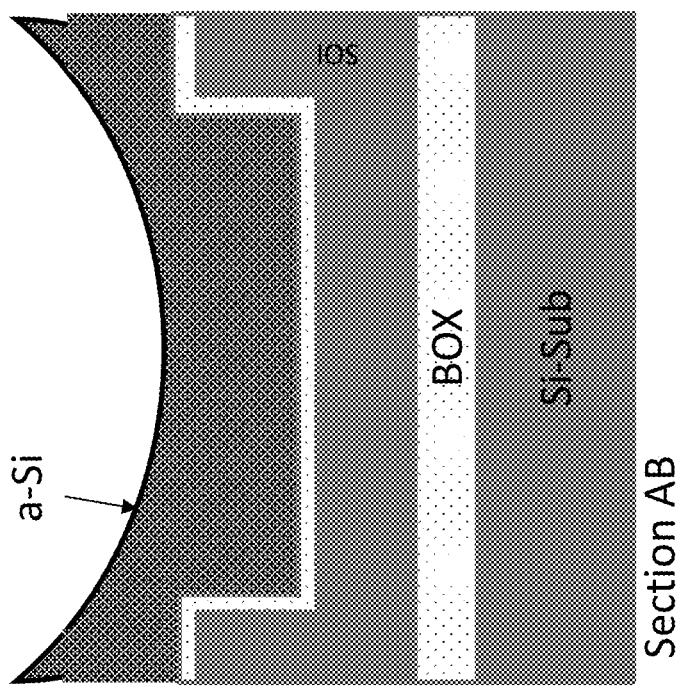
FIG. 4H is a cross-sectional view of an intermediate product in a process for fabricating a waveguide structure, according to an embodiment of the present disclosure.
Figure 4G:
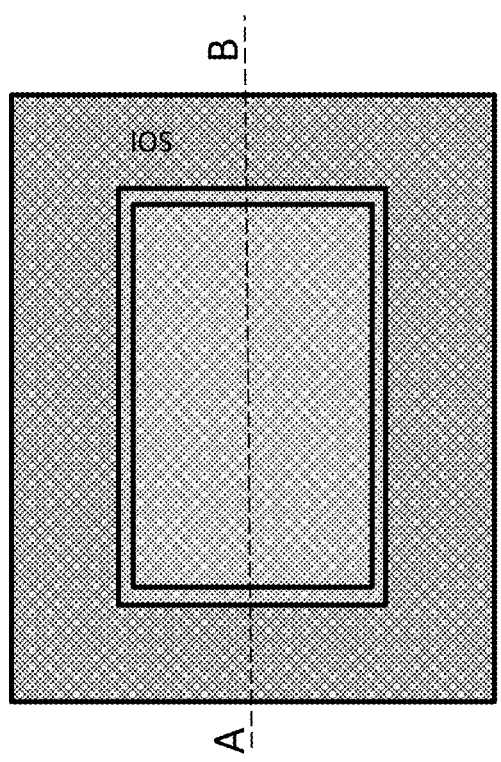
FIG. 4G is a top view of an intermediate product in a process for fabricating a waveguide structure, according to an embodiment of the present disclosure.
Figure 4J:
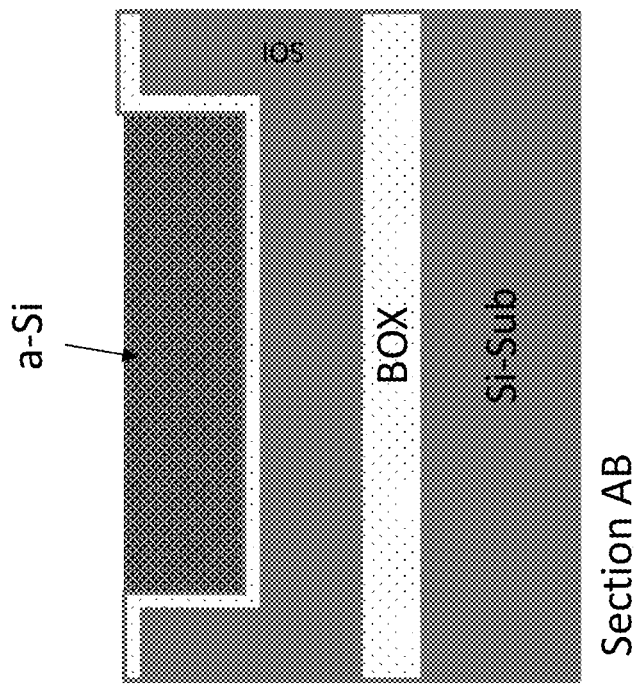
FIG. 4J is a cross-sectional view of an intermediate product in a process for fabricating a waveguide structure, according to an embodiment of the present disclosure.
Figure 4I:
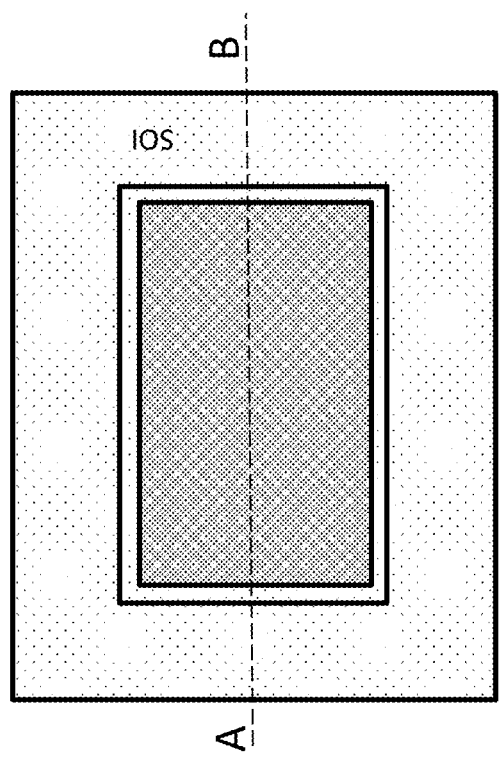
FIG. 4I is a top view of an intermediate product in a process for fabricating a waveguide structure, according to an embodiment of the present disclosure.
Figure 4L:
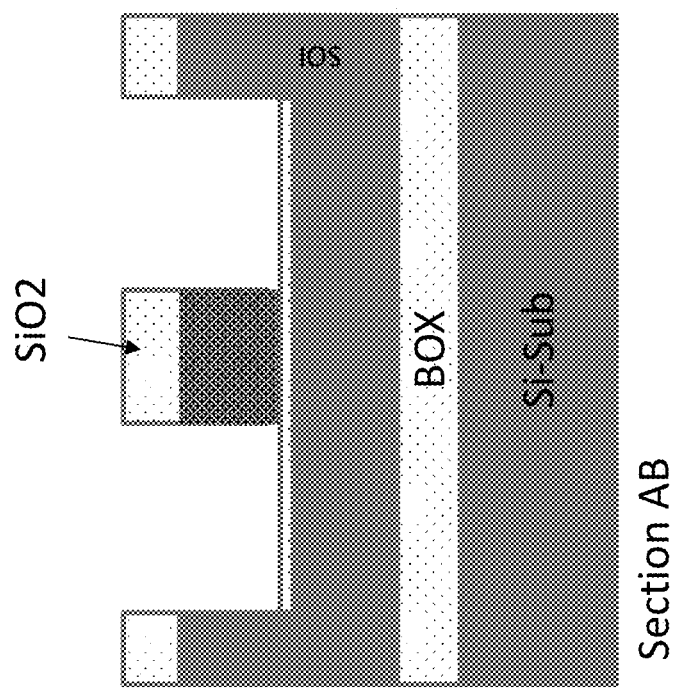
FIG. 4L is a cross-sectional view of an intermediate product in a process for fabricating a waveguide structure, according to an embodiment of the present disclosure.
Figure 4K:
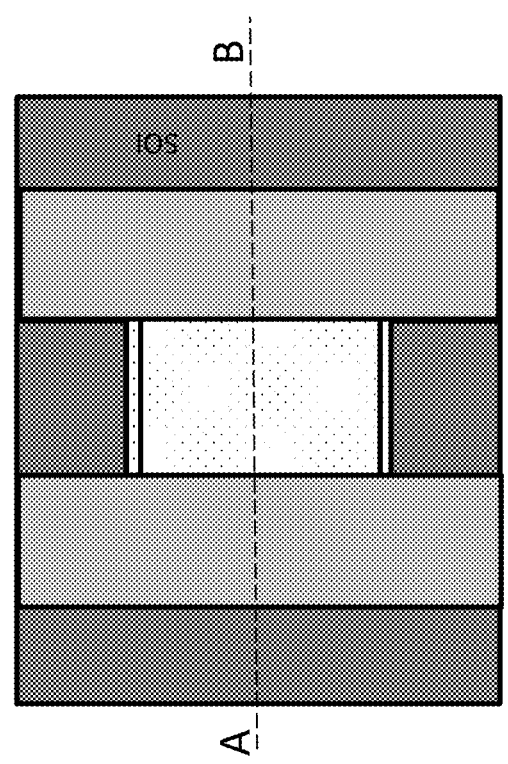
FIG. 4K is a top view of an intermediate product in a process for fabricating a waveguide structure, according to an embodiment of the present disclosure.
Figure 4N:
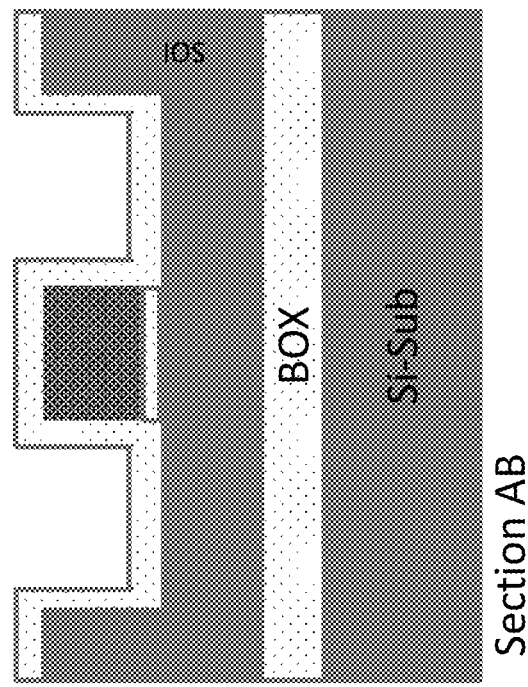
FIG. 4N is a cross-sectional view of an intermediate product in a process for fabricating a waveguide structure, according to an embodiment of the present disclosure.
Figure 4M:
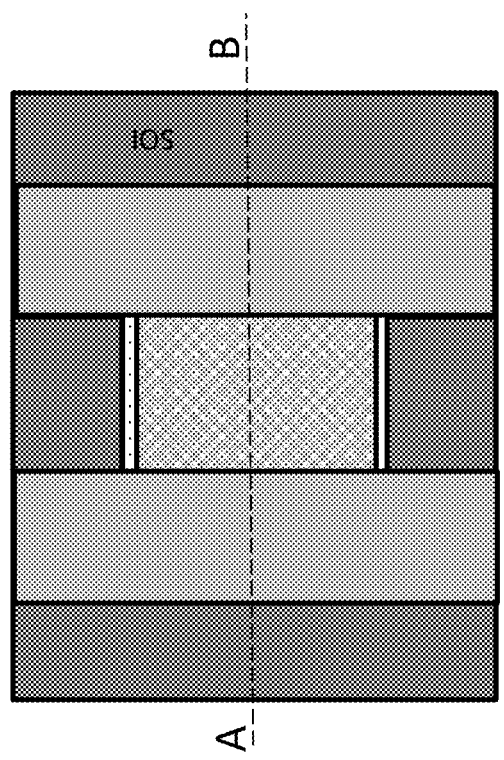
FIG. 4M is a top view of an intermediate product in a process for fabricating a waveguide structure, according to an embodiment of the present disclosure.
Figure 4P:
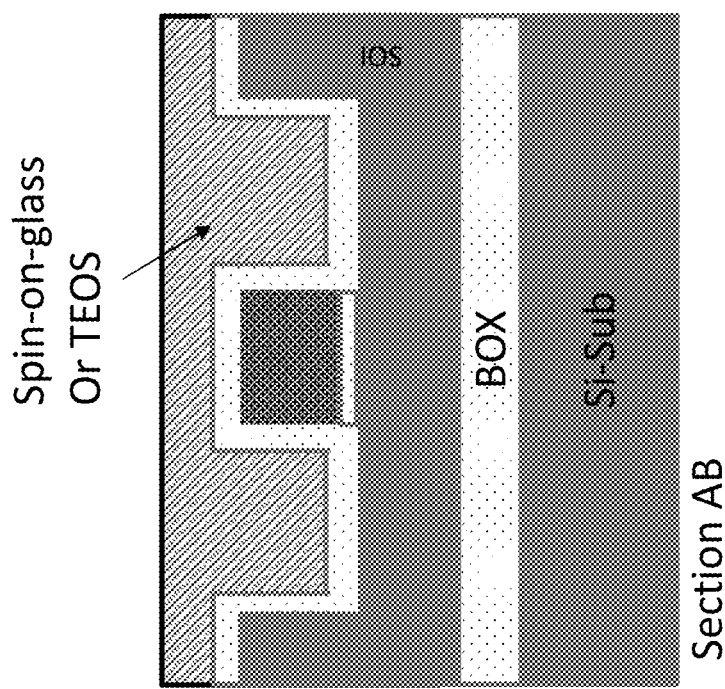
FIG. 4P is a cross-sectional view of an intermediate product in a process for fabricating a waveguide structure, according to an embodiment of the present disclosure.
Figure 4O:
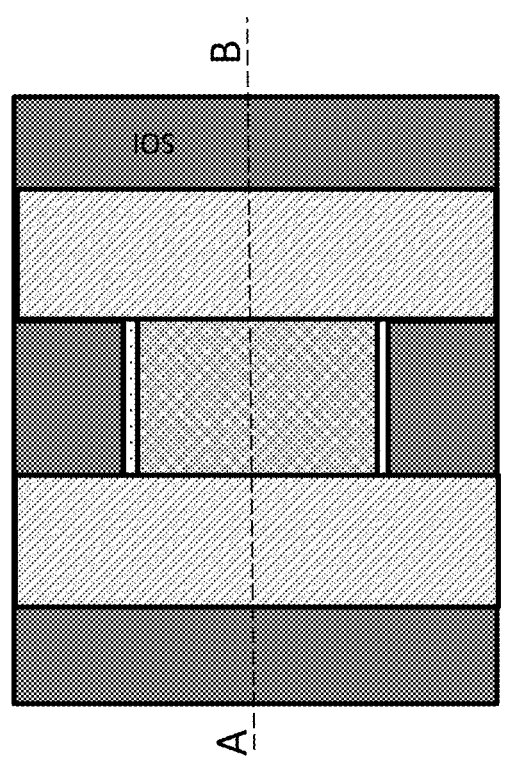
FIG. 4O is a top view of an intermediate product in a process for fabricating a waveguide structure, according to an embodiment of the present disclosure.
Figure 4R:
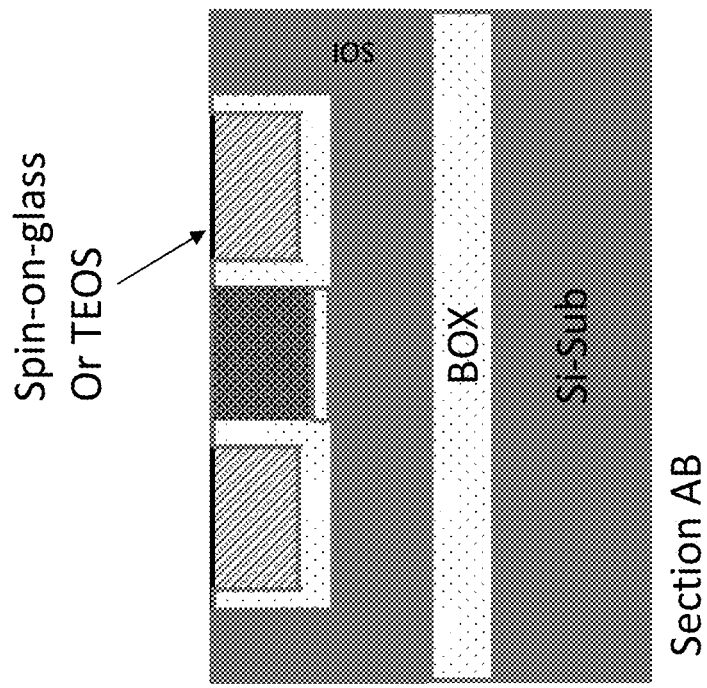
FIG. 4R is a cross-sectional view of an intermediate product in a process for fabricating a waveguide structure, according to an embodiment of the present disclosure.
Figure 4Q:
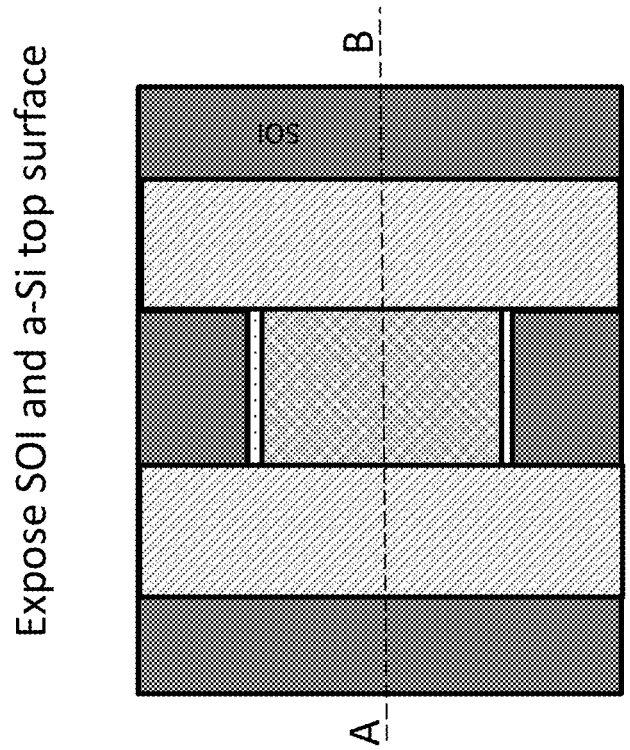
FIG. 4Q is a top view of an intermediate product in a process for fabricating a waveguide structure, according to an embodiment of the present disclosure.
Figure 4T:
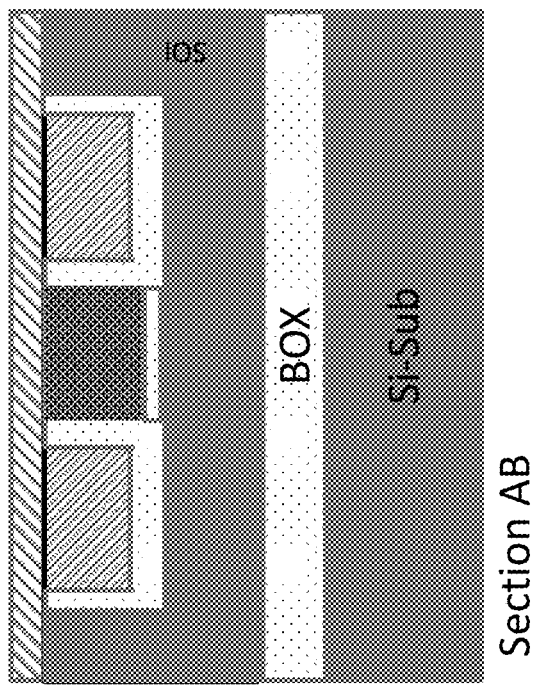
FIG. 4T is a cross-sectional view of an intermediate product in a process for fabricating a waveguide structure, according to an embodiment of the present disclosure.
Figure 4S:
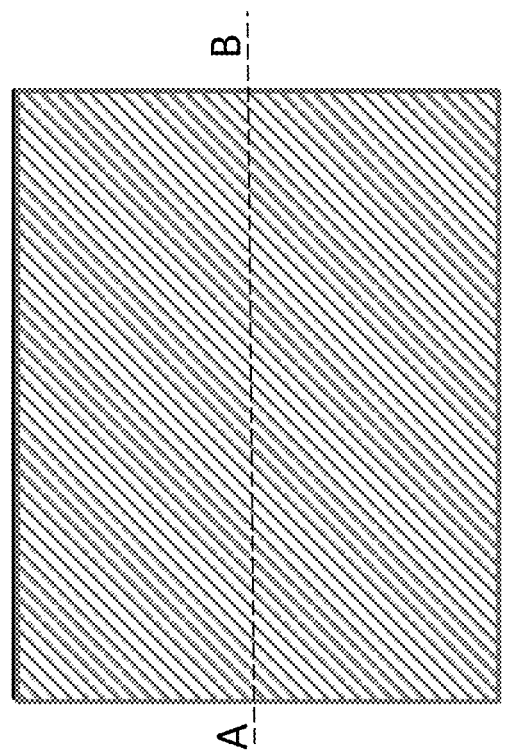
FIG. 4S is a top view of an intermediate product in a process for fabricating a waveguide structure, according to an embodiment of the present disclosure.
Figure 4V:
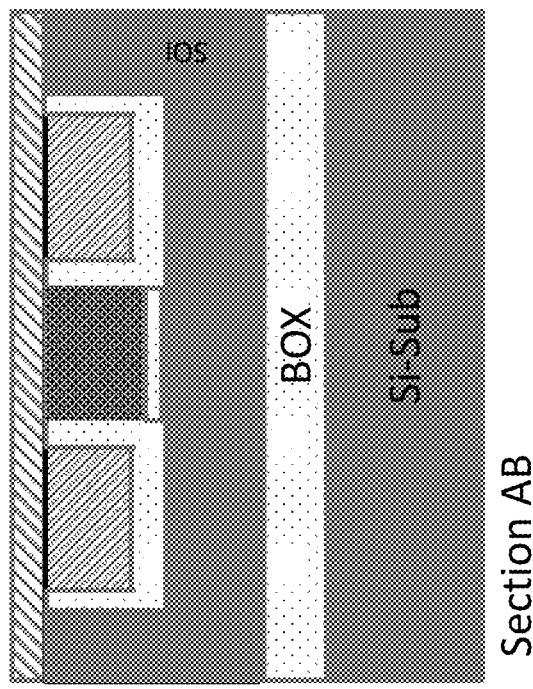
FIG. 4V is a cross-sectional view of an intermediate product in a process for fabricating a waveguide structure, according to an embodiment of the present disclosure.
Figure 4U:
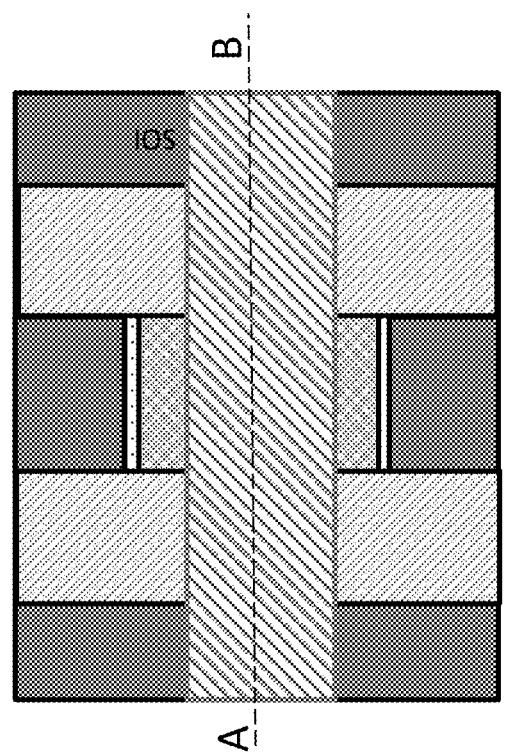
FIG. 4U is a top view of an intermediate product in a process for fabricating a waveguide structure, according to an embodiment of the present disclosure.
Figure 4X:
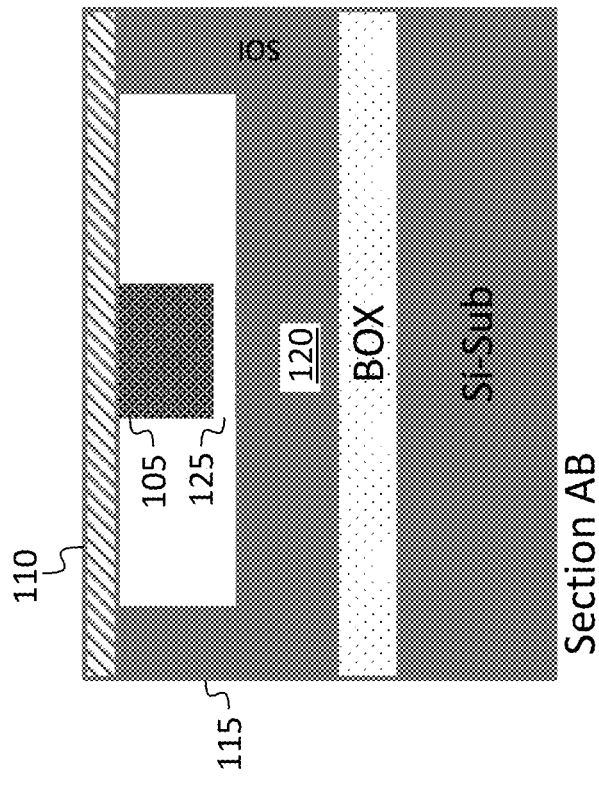
FIG. 4X is a cross-sectional view of an intermediate or final product in a process for fabricating a waveguide structure, according to an embodiment of the present disclosure.

FIGS. 4A-4X show intermediate products (and a final product) in the fabrication, according to some embodiments, of, e.g., the structure of FIGS. 1A-1D. The drawings are arranged in pairs, with a first drawing of each pair (e.g., FIG. 4A) showing a top view, and a second drawing of each pair (e.g., FIG. 4B) showing a cross sectional view taken along the line AB shown in the first drawing of the pair. FIGS. 4A and 4B show a silicon on insulator wafer.

Figure 4W:
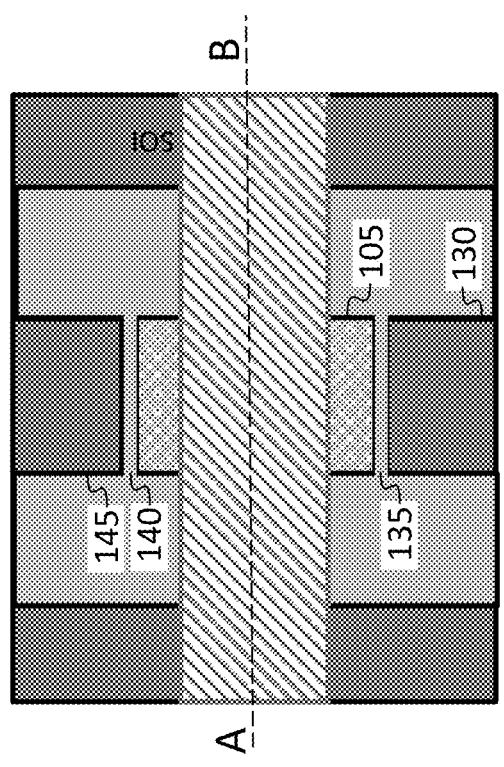
FIG. 4W is a top view of an intermediate or final product in a process for fabricating a waveguide structure, according to an embodiment of the present disclosure.
Figure 5B:
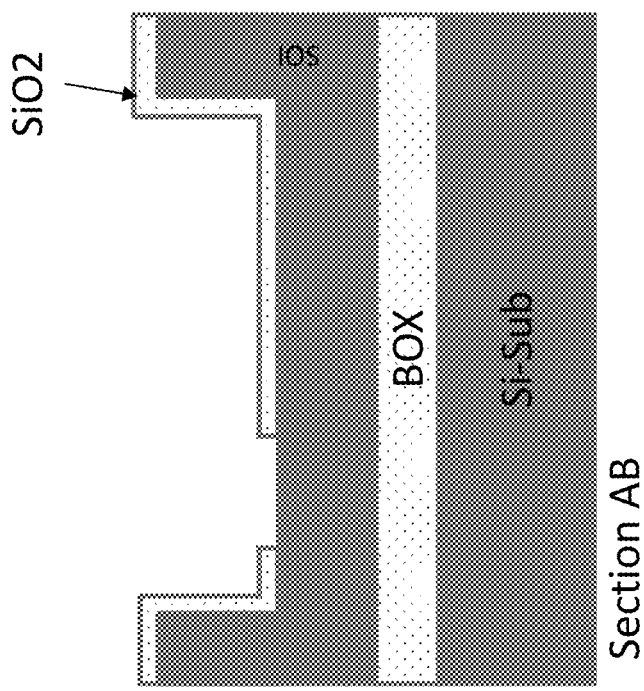
FIG. 5B is a cross-sectional view of an intermediate product in a process for fabricating a waveguide structure, according to an embodiment of the present disclosure.
Figure 5A:
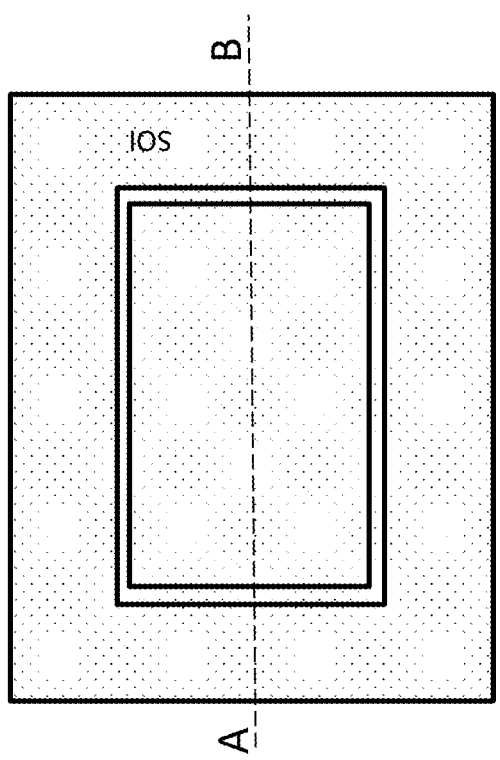
FIG. 5A is a top view of an intermediate product in a process for fabricating a waveguide structure, according to an embodiment of the present disclosure.
Figure 5D:
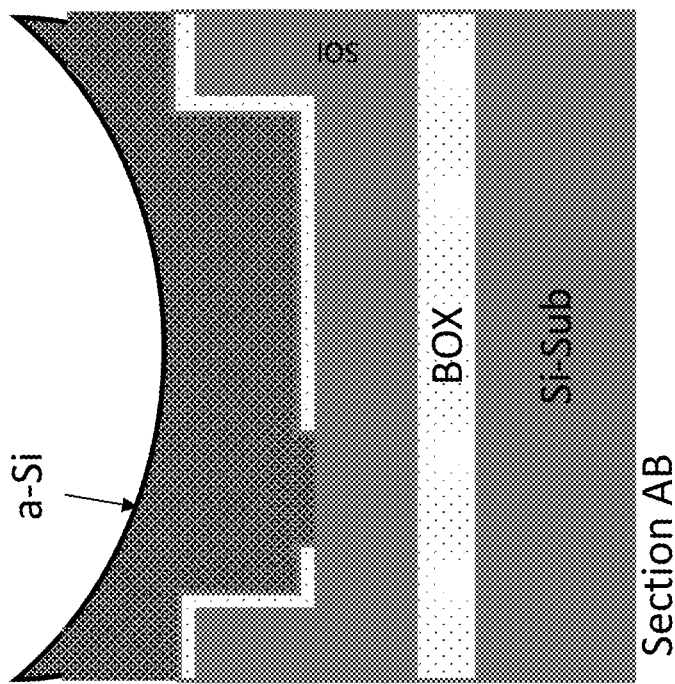
FIG. 5D is a cross-sectional view of an intermediate product in a process for fabricating a waveguide structure, according to an embodiment of the present disclosure.
Figure 5C:
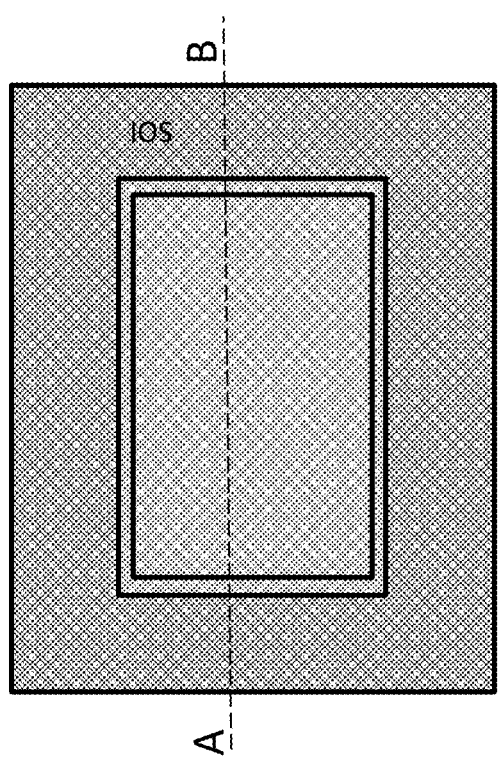
FIG. 5C is a top view of an intermediate product in a process for fabricating a waveguide structure, according to an embodiment of the present disclosure.
Figure 5F:
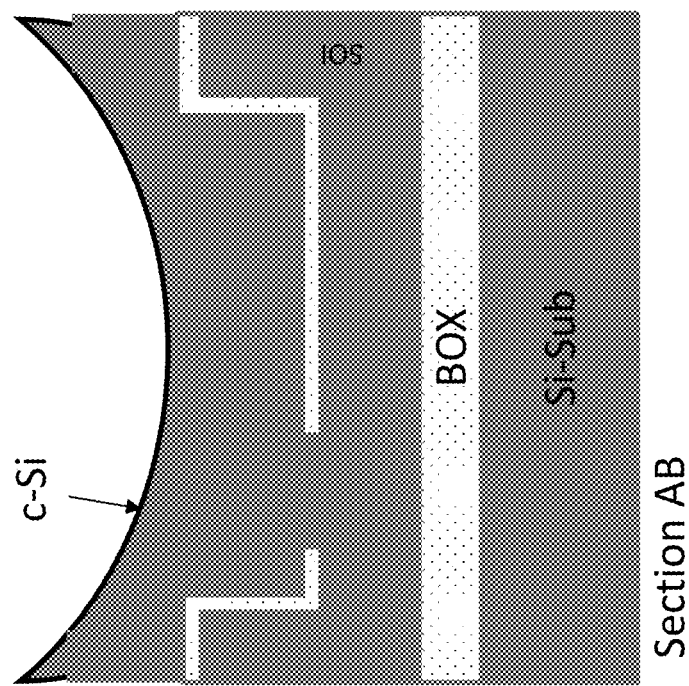
FIG. 5F is a cross-sectional view of an intermediate product in a process for fabricating a waveguide structure, according to an embodiment of the present disclosure.
Figure 5E:
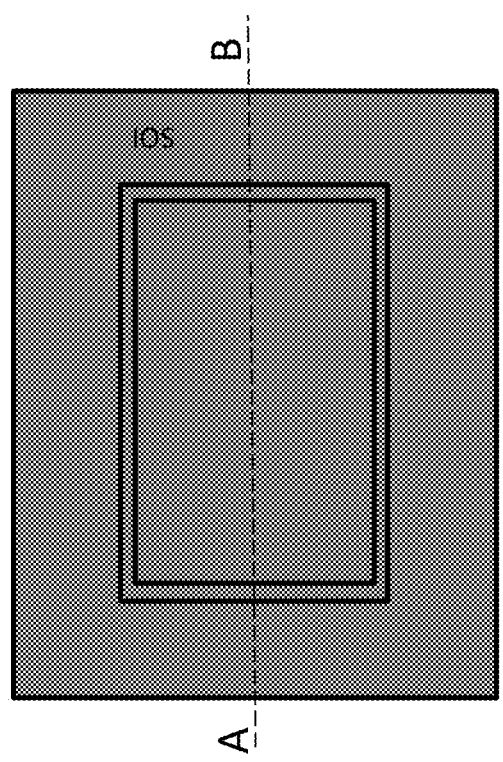
FIG. 5E is a top view of an intermediate product in a process for fabricating a waveguide structure, according to an embodiment of the present disclosure.

A layer of SiO2 is deposited on the wafer, a photoresist mask is formed over the layer of SiO2, a cavity is etched into the device layer, and the remainder of the layer of SiO2 and the photoresist mask are removed (FIGS. 4C and 4D). A layer of SiO2 is then deposited on the wafer (and in the cavity) (FIGS. 4E and 4F). The thickness of this layer of SiO2 defines the width of the first gap 125 and the width of the second gap. Amorphous silicon is deposited over the wafer (FIGS. 4G and 4H), chemical mechanical polishing (CMP) is used to planarize the top surface to be flush with the top of the previously deposited layer of SiO2 (FIGS. 4I and 4J), a layer of SiO2 is deposited and lithography is used to form the amorphous silicon rib (which is the first portion 105 of the first waveguide) (FIGS. 4K and 4L), the SiO2 is etched away from the top surface, and a top cladding layer of SiO2 is deposited over the wafer (FIGS. 4M and 4N). A layer of spin-on-glass (or tetraethoxysilane (TEOS)) may be deposited to fill the cavity (FIGS. 4O and 4P), a dry etch, or chemical mechanical polishing (CMP) is used to trim the spin-on-glass (or TEOS) and to expose the top surface of the device layer and of the first portion 105 of the first waveguide (FIGS. 4Q and 4R), Si3N4 is deposited on the wafer (FIGS. 4S and 4T), lithography and etching are used to form the flexible support element 110 (FIGS. 4U and 4V), and wet etch (using, e.g., buffered oxide etchant (BOE)), is used to remove (in the cavity area) spin-on-glass (or TEOS) and SiO2 (the region outside of the cavity area may be covered by photoresist and nitride (not shown)) to form the final product (FIGS. 4W and 4X).

A variant of the process of FIGS. 4A-4X may be employed to form a structure in which the first portion 105 of the first waveguide is composed of crystalline silicon instead of being composed of amorphous silicon. A portion of such a process is shown in FIGS. 5A-5F. Beginning with the intermediate product of FIGS. 4E and 4F, a window is etched in the layer of SiO2 (which, as in the process of FIGS. 4A-4X, defines the width of the first gap 125). The window is formed to enable the subsequent annealing of amorphous silicon to form crystalline silicon, as discussed in further detail below. Amorphous silicon is deposited over the wafer (FIGS. 5C and 5D), the amorphous silicon is annealed (using the portion of the device layer, with which the amorphous silicon is in contact at the window, as a seed layer) to form crystalline silicon (FIGS. 5E and 5F), and the process steps corresponding to FIGS. 4I-4X are performed to produce, e.g., the structure of FIGS. 1H-1J.

In some applications (e.g., if the wavelength of acoustic waves being sensed is greater than the transverse dimensions of the first portion 105 of the first waveguide, or if there is a risk of contamination of the sensor by fluids or particles), it may be advantageous for the sensor to be hermetically sealed, with, e.g., clean air in the cavity, in the first gap 125, and in the second gap 135 (if present). The hermetic seal of the sensor may be made by filling (e.g., with oxide (SiO2)) the trenches defining the ribs of the second waveguide 130 and of the third waveguide 145, and by widening the flexible support element 110 so that it fully seals the cavity. One or more narrow slits may be etched into the flexible support element 110 to let etchant in to remove the spin-on-glass (or TEOS) and the oxide; a thin layer of oxide or nitride may then be deposited over the slits to seal the cavity after the wet etch. The layer of oxide or nitride may form a patch over each slit, and may be etched away elsewhere on the flexible support element 110 to keep the flexible support element 110 flexible. The slits may be perpendicular to the waveguides (with, e.g., one slit at each end of the cavity) or parallel to the waveguides.

Figure 6K:
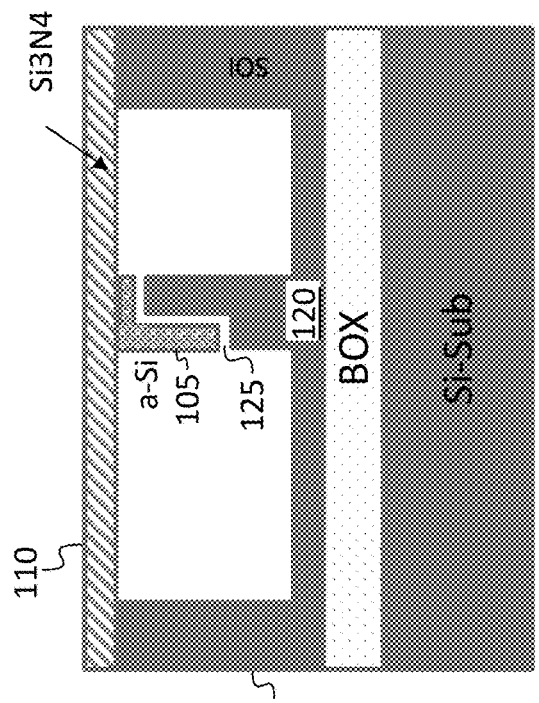
FIG. 6K is a cross-sectional view of a waveguide structure, according to an embodiment of the present disclosure.
Figure 6L:
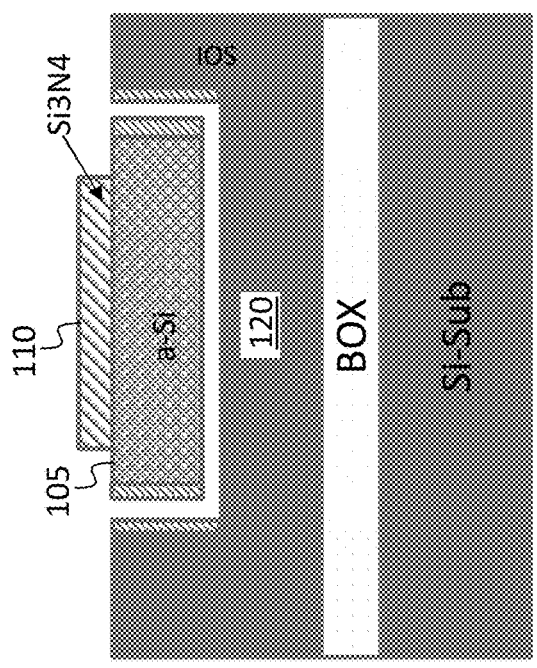
FIG. 6L is a cross-sectional view of a waveguide structure, according to an embodiment of the present disclosure.
Figure 6J:
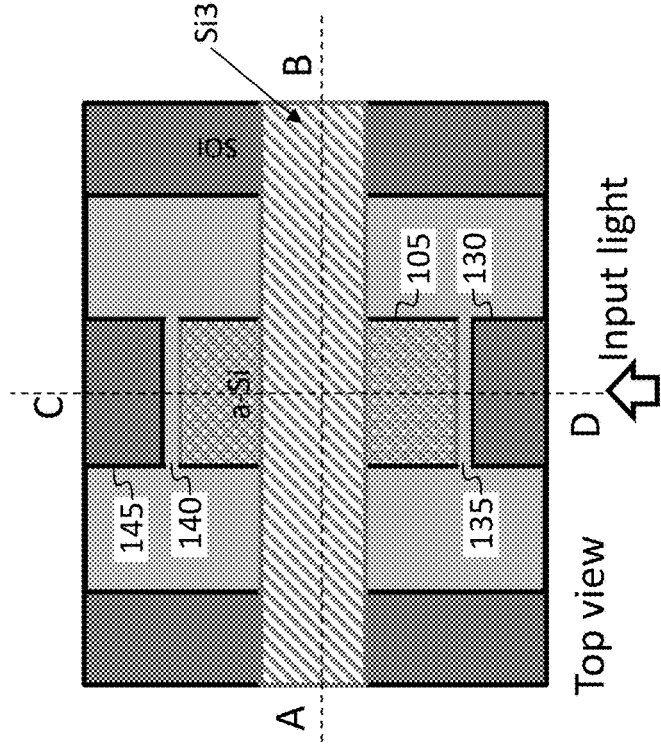
FIG. 6J is a top view of a waveguide structure, according to an embodiment of the present disclosure.

FIGS. 6A-6R show variants of the structure of FIGS. 1A-1D (further variants, in which the first portion 105 of the first waveguide is composed of crystalline silicon may be constructed in an analogous manner). FIGS. 6A-6C show an embodiment in which the first gap 125 is higher than the bottom of the rib of the first waveguide, FIGS. 6D-6F show an embodiment in which the rib of the first waveguide is separated into two portions that are side by side, FIGS. 6G-6I show an embodiment in which the rib of the first waveguide is separated into two portions each of which has two steps, FIGS. 6J-6L show an embodiment in which the rib of the first waveguide is separated into two portions each of which has two steps, with dimensions and the horizontal offset differing from those of FIGS. 6G-6I, FIGS. 6M-6R show two embodiments in which the first gap 125 is higher than the bottom of the rib of the first waveguide; in one of these two embodiments, the slab portion of the first waveguide is absent (or nearly absent) on one side of the rib (FIGS. 6M-6O), and in the other of these two embodiments the slab portion of the first waveguide is absent (or nearly absent) on both sides of the rib (FIGS. 6P-6R).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B. As used herein, the term "rectangle" includes a square as a special case, i.e., a square is an example of a rectangle, and the term "rectangular" encompasses the adjective "square".

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

As used herein, the term "major component" refers to a component that is present in a composition, polymer, or product in an amount greater (by weight) than an amount of any other single component in the composition or product. In contrast, the term "primary component" refers to a component that makes up at least 50% by weight or more of the composition, polymer, or product. As used herein, any structure or layer that is described as being "made of" or "composed of" a substance should be understood (i) in some embodiments, to contain that substance as the primary component, or (ii) in some embodiments, to contain that substance as the major component, or (iii) in some embodiments, to contain between 50% and 100% of that substance.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a pressure sensor have been specifically described and illustrated herein, many modifications and variations will be apparent to those skilled in the art. Accordingly, it is to be understood that a pressure sensor constructed according to principles of this disclosure may be embodied other than as specifically described herein. The invention is also defined in the following claims, and equivalents thereof.

What is claimed is:

1. A sensor, comprising:
 a silicon-on-insulator wafer, comprising:
  a silicon substrate,
  a buried oxide (BOX) layer above the silicon substrate, and
  a silicon device layer above the BOX layer and having a cavity formed therein;
 a first waveguide comprising a first portion and a second portion, the second portion being a portion of the silicon device layer, and the first portion being positioned in the cavity and above the second portion;

a flexible support element coupled to the first portion of the first waveguide, extending over the cavity, and configured to move between an unbent state and a bent state;

a second waveguide, the second waveguide being a portion of the silicon device layer; and a third waveguide, the third waveguide being a portion of the silicon device layer, the first portion of the first waveguide being suspended in the cavity from the flexible support element and configured, when the flexible support element is in the unbent state, to be separated by a first gap from the second portion of the first waveguide, the first gap being between a bottom surface of the first portion and a top surface of the second portion, the flexible support element being capable of bending so as to cause an effective index of refraction of the first waveguide to change, the first waveguide being optically coupled to the second waveguide through a second gap, the second gap being between a first end of the first waveguide and an end of the second waveguide and physically separating the first and second waveguides in a longitudinal direction that is parallel to a direction of propagation of input light, and the first waveguide being coupled to the third waveguide through a third gap, the third gap being between a second end of the first waveguide and an end of the third waveguide and physically separating the first and third waveguides in the longitudinal direction.

2. The sensor of claim 1, wherein the first waveguide and the second waveguide are aligned along a shared plane.

3. The sensor of claim 1 wherein the second waveguide is composed of crystalline silicon.

4. The sensor of claim 1, wherein the second gap is oblique to the first waveguide and to the second waveguide.

5. The sensor of claim 1, wherein the flexible support element is a bridge across the cavity.

6. The sensor of claim 1, wherein the first portion of the first waveguide is composed of amorphous silicon.

7. The sensor of claim 1, wherein the first portion of the first waveguide is composed of crystalline silicon.

8. The sensor of claim 1, wherein the second portion of the first waveguide is composed of crystalline silicon.

9. The sensor of claim 1, wherein the second portion of the first waveguide is a slab.

10. The sensor of claim 1, wherein the second portion of the first waveguide comprises a rib.

11. The sensor of claim 10, wherein the second portion of the first waveguide comprises a slab, the rib of the second portion of the first waveguide being on the slab.

12. The sensor of claim 1, wherein the flexible support element is composed of silicon nitride.

13. The sensor of claim 1, comprising a Mach Zehnder interferometer having a first arm and a second arm, the first waveguide being a portion of the first arm, and the second waveguide being a portion of the first arm.

14. The sensor of claim 1, wherein, when the flexible support element is unbent, the first gap has a width greater than 1 nm and less than 50 nm.

15. The sensor of claim 1, wherein the second gap has a width greater than 5 nm and less than 100 nm.

16. The sensor of claim 1, further comprising a hermetic seal that seals the cavity.

17. A sensor, comprising:
a silicon-on-insulator wafer, comprising:
a silicon substrate,
a buried oxide (BOX) layer above the silicon substrate, and
a silicon device layer above the BOX layer and having a cavity formed therein;
a ring resonator, comprising:
a first waveguide comprising a first portion of the ring resonator and being positioned in the cavity, and
a second waveguide comprising a second portion of the ring resonator and coupled to the first waveguide through each of two gaps between two ends of the first waveguide and two ends of the second waveguide;
a flexible support element coupled to the first waveguide, extending over the cavity, and configured to move between an unbent state and a bent state; and
a third waveguide, the third waveguide being a portion of the silicon device layer,
the first waveguide being a suspended waveguide comprising a first waveguide portion and a second waveguide portion,
the first waveguide portion of the first waveguide being suspended in the cavity from the flexible support element and configured, when the flexible support element is in the unbent state, to be separated from the second waveguide portion by a first gap between a bottom surface of the first waveguide portion and a top surface of the second waveguide portion,
the flexible support element being capable of bending so as to cause an effective index of refraction of the ring resonator to change,
the third waveguide being a solid waveguide,
the ring resonator being coupled to the third waveguide through a second gap between a sidewall of the ring resonator and a sidewall of the third waveguide.

18. The sensor of claim 17, wherein the third waveguide is composed of crystalline silicon.

19. The sensor of claim 17, wherein, when the flexible support element is unbent, the first gap has a width greater than 1 nm and less than 50 nm.

20. The sensor of claim 17, wherein the second gap is between a sidewall of the second waveguide and the sidewall of the third waveguide.

21. The sensor of claim 17, wherein the second gap is between a sidewall of the first waveguide and the sidewall of the third waveguide.

* * * * *